United States Patent
Brasfield et al.

(10) Patent No.: US 10,732,861 B2
(45) Date of Patent: Aug. 4, 2020

(54) GENERATING AND PROVIDING LOW-LATENCY CACHED CONTENT

(71) Applicant: Qualtrics, LLC, Provo, UT (US)

(72) Inventors: Matthew Brasfield, Pleasant Grove, UT (US); Christopher Kuchin, Provo, UT (US); David Mecham, Springville, UT (US); Jared Ririe, Lehi, UT (US)

(73) Assignee: QUALTRICS, LLC, Provo, UT (US)

( * ) Notice: Subject to any disclaimer, the term of this patent is extended or adjusted under 35 U.S.C. 154(b) by 65 days.

(21) Appl. No.: 16/046,613

(22) Filed: Jul. 26, 2018

(65) Prior Publication Data

US 2020/0034050 A1    Jan. 30, 2020

(51) Int. Cl.
*G06F 3/06* (2006.01)
*G06F 12/084* (2016.01)

(52) U.S. Cl.
CPC ............ *G06F 3/0619* (2013.01); *G06F 3/065* (2013.01); *G06F 3/067* (2013.01); *G06F 3/0656* (2013.01); *G06F 12/084* (2013.01); *G06F 2212/1032* (2013.01); *G06F 2212/154* (2013.01); *G06F 2212/163* (2013.01)

(58) Field of Classification Search
CPC ........ G06F 3/0619; G06F 3/067; G06F 3/065; G06F 3/0656; G06F 12/084; G06F 2212/154; G06F 2212/163; G06F 2212/1032
See application file for complete search history.

(56) References Cited

U.S. PATENT DOCUMENTS

| | | | |
|---|---|---|---|
| 2009/0262741 A1* | 10/2009 | Jungck | H04L 29/12066 370/392 |
| 2011/0145367 A1* | 6/2011 | Ananthanarayanan | G06F 16/1858 709/219 |
| 2012/0173541 A1* | 7/2012 | Venkataramani | G06F 12/0844 707/747 |
| 2014/0089465 A1* | 3/2014 | van Brandenburg | H04L 65/605 709/217 |
| 2014/0156777 A1* | 6/2014 | Subbiah | H04L 67/1097 709/213 |
| 2016/0088072 A1* | 3/2016 | Likhtarov | H04L 67/1008 709/226 |

* cited by examiner

*Primary Examiner* — Hiep T Nguyen
(74) *Attorney, Agent, or Firm* — Keller Jolley Preece

(57) ABSTRACT

Embodiments of the present disclosure relate to facilitating efficient access to electronic content via an intermediate caching layer between a client device and remote storage system. In particular, systems and methods disclosed herein generate and maintain a regional cache on a data center that includes a subset of digital content items from a collection of digital content items stored on the remote storage system. For example, in response to receiving a data request, the systems and methods disclosed herein determine whether a digital content item corresponding to the data request exists on an intermediate caching layer including both a local data center and one or more remote data centers. The systems and methods facilitate obtaining copies of requested digital content items from the regional caches when available, resulting in faster responses to data requests while decreasing a number of times a client directly accesses the remote storage system.

20 Claims, 10 Drawing Sheets

GENERATING AND PROVIDING LOW-LATENCY CACHED CONTENT

BACKGROUND

Remote storage systems (e.g., cloud storage) provide numerous ways for people to store and manage access to digital content. For example, conventional remote storage systems enable client devices to utilize resources of one or more remote server storage devices to store, share, and otherwise manage digital content while preserving local storage space of individual client devices. Indeed, rather than storing all data including files, documents, programs, photos, videos, and various data objects on a local hard drive or local network of computing devices, users can remotely store and access any number of files using remote storage space provided via conventional remote storage systems.

Storing and managing digital content via conventional remote storage systems, however, suffers from a number of limitations and drawbacks. For example, accessing and downloading data from a conventional remote storage system takes more time than accessing local storage, often resulting in delays for users attempting to access remotely stored data. Indeed, many data requests for remotely stored content include requests for data across hundreds or thousands of different files compounding the time required to access each of the relevant data files associated with the data request(s). As a result, utilizing conventional remote storage systems can create a frustrating experience for many users.

In addition to generally creating a frustrating or slow experience for users, conventional remote storage systems often experience failure and crashes as a result of the delays in accessing content from remote storage. For example, where many applications rely on accessing remotely stored data in a timely manner, those applications may fail to perform routine functions or crash altogether, particularly where requests for data include multiple requests for different data files. Indeed, where remote access is delayed, problems in operating various applications can compound, resulting in failure of performing various operations on a computing device.

In addition to charging for storage space, many conventional remote storage systems have costs associated with accessing data. For example, many conventional remote storage systems charge users, companies, or other entities for each attempt to access data stored on the cloud. As a result, accessing storage can be expensive, particularly in cases where a large number of users consistently attempt to access data. Indeed, many conventional remote storage systems receive thousands of requests per minute, amounting to millions of requests per day. Accordingly, utilizing conventional cloud storage systems can become very expensive.

Furthermore, many conventional remote storage systems fail to provide consistent or accurately synchronized copies of files where multiple users have simultaneous access to the files. For example, where multiple users attempt to simultaneously access and perform operations on a file, many conventional systems fail to recognize certain operations or give priority to certain users, resulting in non-synchronized copies of the file on different nodes of a computer network. As a result, many conventional systems inadvertently delete certain versions of files or fail to ensure consistency between copies of files accessed by multiple computer devices.

These and other problems exist with regard to utilizing and providing access to digital content stored on cloud storage systems.

BRIEF SUMMARY

Embodiments of the present disclosure provide benefits and/or solve one or more of the foregoing or other problems in the art with systems, computer-readable media, and methods for providing low-latency access to a remotely stored collection of data. In particular, the disclosed systems facilitate low-latency access to a collection of remotely stored data by way of an intermediate caching layer between a client device and a remote storage system (e.g., a network of remote server device(s)). For example, the disclosed systems utilize an intermediate caching layer that includes a number of regional data centers. Each regional data center generates and maintains a regional cache of stored data that includes a subset of data from the collection of data maintained on the remote storage system. The disclosed systems further facilitate low-latency access to one or more of the regional caches of data, which decreases how often the disclosed system accesses the remote storage system.

For example, as will be described in further detail below, the disclosed systems compile a regional cache on a data center (e.g., a local data center) of an intermediate caching layer that includes multiple regional data centers. Indeed, each of the multiple data centers of the intermediate caching layer include respective regional caches that include subsets of data from a larger collection of data accessible via the remote storage system (e.g., a cloud storage system). In response to receiving a request for data at a data center, the data center determines whether the requested data is stored on any of the regional caches of the intermediate caching layer. Where the data center fails to identify the requested data at any of the data centers of the intermediate caching layer, the data center can retrieve the requested data from the remote storage system and provide the data to a client device. Thereafter, if the client device or another client device in communication with the data center (or another of the multiple data centers) requests the data again, the data center can quickly provide the requested data without directly accessing the cloud storage system.

Additional features and advantages of the embodiments will be set forth in the description that follows, and in part will be obvious from the description, or may be learned by the practice of such exemplary embodiments. The features and advantages of such embodiments may be realized and obtained by means of the instruments and combinations particularly pointed out in the appended claims. These, and other features, will become more fully apparent from the following description and appended claims, or may be learned by the practice of such exemplary embodiments as set forth hereinafter.

BRIEF DESCRIPTION OF THE DRAWINGS

In order to describe the manner in which the above-recited and other advantages and features of the disclosure can be obtained, a more particular description of the disclosure briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments of the disclosure and are not therefore considered to be limiting of its scope, the disclosure will be described and explained with additional specificity and detail through the use of the accompanying drawings, in which.

DETAILED DESCRIPTION

Figure 1:
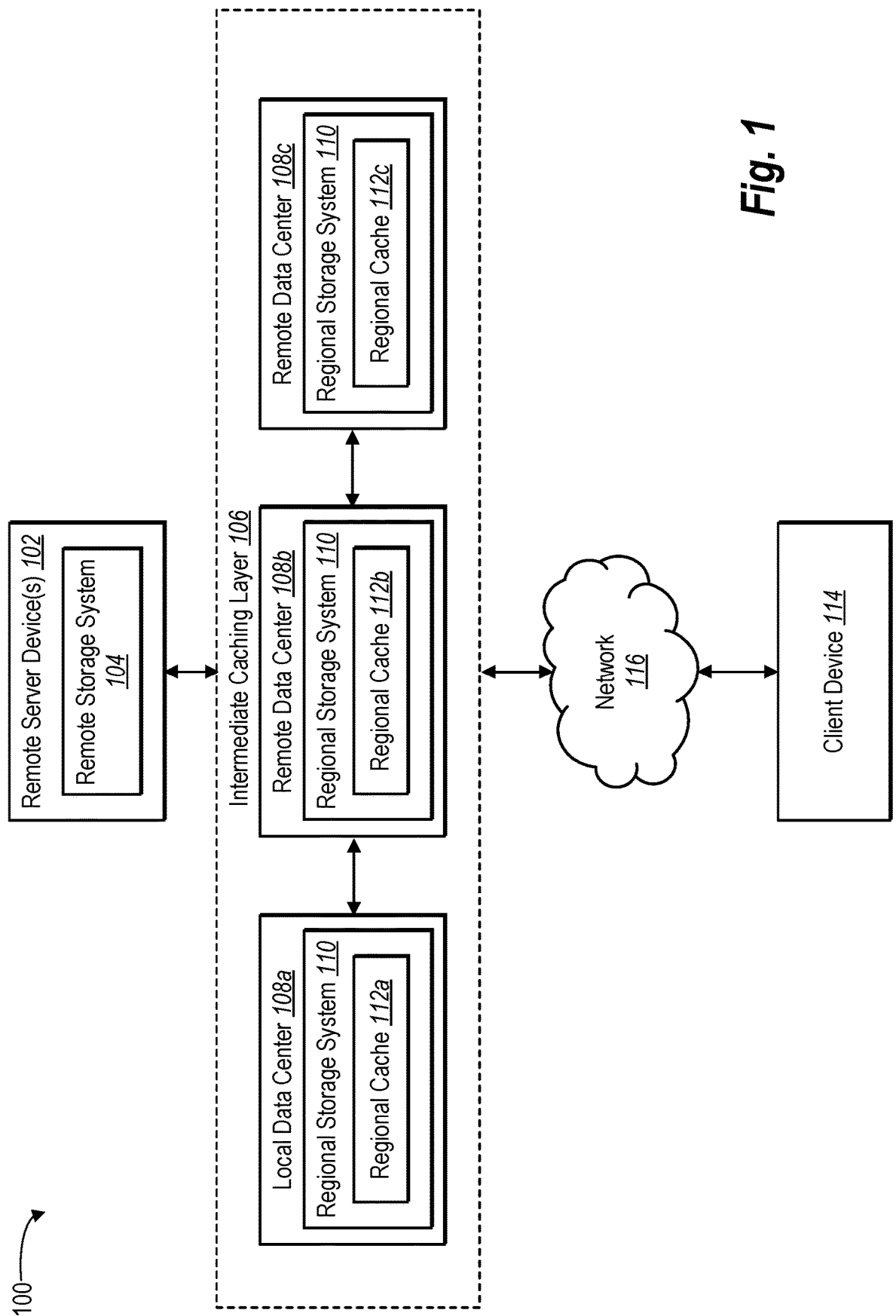
FIG. 1 illustrates a block diagram of an environment in which a regional storage system is implemented in accordance with one or more embodiments.

One or more embodiments described herein provide a regional storage system that enables a user to quickly access electronic content via an intermediate caching layer while reducing a number of requests to access a remote storage system (e.g., a cloud storage system). In particular, the regional storage system generates and maintains a regional cache on a data center including a subset of digital content items from a collection of digital content items stored on the remote storage system. The regional storage system receives a data request including a reference identifier, identifies a digital content item corresponding to the data request, and, determines, based on the reference identifier, whether a copy of the digital content item exists on the intermediate caching layer. If the regional storage system fails to identify the digital content item on the intermediate caching layer, the regional storage system accesses the digital content item on the remote storage system and adds the digital content item to the regional cache. In this way, the regional storage system can quickly provide the cached copy of the digital content item in response to subsequent data requests from the same or different client devices.

As an overview, the regional storage system can receive and process a request for a digital content item at the intermediate caching layer between a client device (e.g., the requesting client device) and a remote storage system. In particular, as will be described in further detail below, the intermediate caching layer can include a number of data centers including respective networks of nodes (e.g., computing devices) that store copies of digital content items from a collection of digital content items accessible via the remote storage system. A data center can receive a data request including a reference identifier (e.g., a key), identify the digital content item based on the data request, and utilize the reference identifier to identify whether the digital content item exists on any of the data centers of the intermediate caching layer.

In particular, the regional storage system can utilize the reference identifier to identify a node (e.g., a server node) within a custer of nodes on the data center (e.g., a hash ring) capable of determining a location on which a copy of the digital content item is stored. For example, as will be described in further detail below, the regional storage system can incorporate a hash ring including a cluster of nodes on a data center associated with respective reference identifier values (e.g., hash values). Based on the reference identifier associated with the received data request, the regional storage system can identify a node within the hash ring capable of processing the data request and identifying a potential location (e.g., an owner node) of a copy of a requested digital content item.

The regional storage system can perform a number of actions based on whether the copy of the digital content item is located on the intermediate cache layer. For example, where the regional storage system fails to identify a copy of the digital content item on a data center of the intermediate caching layer, the regional storage system can directly access the remote storage system to generate and store a copy of the digital content item on a regional cache of the one or more of the data centers. In this way, when the data center receives a subsequent request from the client device (or another client device) for the digital content item, the regional storage system can provide the stored copy of the digital content item from the regional cache without having to request access to the remote storage system.

Alternatively, in one or more embodiments, the regional storage system can perform a number of actions in response to determining that a copy of the digital content item exists on one or more of the data centers of the intermediate caching layer. For example, where a copy of the digital content item is stored on a node of a local data center (e.g., the data center that receives the search request), the regional storage system can provide the copy to the requesting client device without accessing the remote storage system. Alternatively, where the regional storage system identifies a copy of the digital content item on a regional cache of another data center of the intermediate caching layer other than the local data center (e.g., a remote data center), the regional storage system can request the copy from the remote data center and provide the copy to the requesting client device without accessing the remote storage system.

In one or more embodiments, when the regional storage system determines that the local data center does not include a digital content item, the regional storage system can request the digital content item from a remote storage system in a region of the local data center. If the remote storage system in the region of the local data center does not include the digital content item, then the regional storage system can request the digital content item from a remote storage system in a secondary region, e.g., a region that does not correspond to the region of the local data center. Upon locating the digital content item, the digital content item is added to the intermediate caching layer in the local data center and also is added to the remote storage system corresponding to the region of the local data center.

As will be described in further detail below, each of the data centers of the intermediate caching layer can include a data location database (e.g., a Couchbase server) that that maintains key data, location data, versioning data and other information (e.g., metadata) associated with respective digital content items found on the intermediate caching layer. For example, in one or more embodiments, the regional storage system includes a data location database including location data associated with copies of digital content items maintained on the regional cache of a local data center in addition to location data associated with copies of digital content item maintained on regional caches of additional data centers. Indeed, in one or more embodiments, each of the data centers of the intermediate caching layer includes location data for some or all of the data centers of the intermediate caching layer. As will be described in further detail below, the regional storage system can query or otherwise utilize the data location database on a respective data center to identify a location of any existing copies of a digital content item across each of the plurality of data centers of the intermediate caching layer.

In addition to providing access to copies of digital content items from multiple data centers, the regional storage system can additionally accumulate a regional cache particular to a user or group of users by migrating digital content items to a local data center over time. In particular, where the regional storage system determines that the intermediate caching layer does not include a copy of a digital content item referenced by a data request, the regional storage system can access the remote storage system and store a copy on the regional cache of the local data center. In addition, where the regional storage system determines that a copy of the digital content item exists at a regional data center, the regional storage system can similarly store the copy on the regional cache of the local data center. In this way, the regional storage system can gradually accumulate the regional cache over time based on data requests received over time by one or more users.

As will be described in further detail below, the regional storage system can additionally provide features for providing consistency between versions of digital content items accessed via the intermediate cache layer. In particular, in addition to generally managing storage of a regional cache on a corresponding data center, the regional storage system can further manage edits and other modifications made to respective copies of digital content items. For example, where the regional storage system receives or otherwise detects modifications to a copy of a digital content item, the regional storage system can maintain a consistent record of modifications as well as provide access to versions of the digital content item corresponding to the modifications. In particular, as will be described in further detail below, the regional storage system can generate version identifiers for each of the identified modifications as well as generate and store modified copies of the digital content item corresponding to the modifications.

The regional storage system provides a variety of advantages and benefits over conventional systems. For example, by maintaining a regional cache at a local data center, the regional storage system provides quick and efficient access to a subset of requested digital content items from a larger collection of digital content items on a cloud storage system. Further, by leveraging storage capabilities across multiple data centers, the regional storage system broadens the immediate availability of digital content items from the collection stored on the remote storage system without requiring direct access to the remote storage system. By providing access to multiple regional caches, the regional storage system provides faster access to a greater quantity of requested content than conventional remote storage systems.

By providing faster access, the regional storage system improves operation of client devices by reducing failures and crashes of applications and client devices as a result of delays in accessing content from remote storage. For example, by providing access to the regional cache via data centers as an alternative to directly accessing cloud storage system, the regional storage system provides substantially faster access to digital content items corresponding to data requests. Indeed, where a client device provides a series of multiple data requests, the regional storage system avoids incidentally timing or other types of application or device failure as a result of delays caused by compounding delays of a series of multiple data requests.

In addition to providing fast and convenient access to digital content items from a collection of remotely stored digital content items, the regional storage system additionally provides access to the subset of digital content items while reducing fees incurred as a result of accessing the cloud storage system. In particular, by providing the capability to retrieve digital content items from a regional cache as an alternative to accessing the cloud storage system directly, the regional storage system reduces costs associated with accessing the cloud storage system directly in response to each data request.

Further, by implementing a network of nodes having associated reference identifier values, the regional storage system provides an interface capable of handling a high volume of data requests. In particular, by implementing a network of nodes that share in processing received data requests, the regional storage system avoids stampeding of the regional cache as a result of a single node (e.g., a master node) handing all incoming requests. In this way, the regional storage system further avoids slowdowns caused by delays in processing received data requests, thereby providing requested content for a high volume of data requests at a faster rate than conventional systems. Moreover, the system can deduplicate requests for the same data. For instance, if the data must be retrieved from remote storage, only one request is made to that remote storage and the other concurrent requests wait for the result of that one request.

Moreover, by providing access to multiple regional caches of data centers across multiple locations, the regional storage system additionally facilitates more effective collaboration between operators of client devices at multiple geographic locations. Indeed, where teams of users often include users across multiple cities, states, and countries, the regional storage system provides access to cached digital content items to each of multiple users at different locations rather than providing limited access to those users connected to a specific data center. Accordingly, each of multiple users associated with a collection of digital content items on the cloud storage system can benefit from digital content items stored across multiple data centers of the intermediate caching layer.

As illustrated by the foregoing discussion, the present disclosure utilizes a variety of terms to described features and benefits of the regional storage system. Additional detail is now provided regarding the meaning of these terms.

As used herein, a "data center" refers to a plurality of networked computing devices that cooperate to organize, process, store, and/or disseminate a regional cache including a subset of data from a larger collection of data. In one or more embodiments described herein, a data center refers to a plurality of server devices at a regional facility that includes hardware for storing data and providing access to the data to one or more client devices within a geographical region corresponding to a location of the data center. In one or more embodiments described herein, a data center can refer to a local data center (e.g., a closest data center to a client device) or a remote data center (e.g., a data center that is not the local data center for a client device). In addition, a data center may refer to a portion of an intermediate caching layer that provides a hardware interface between a client device and remote storage system. In addition, as will be described in further detail below, a data center can store a regional cache including a subset of data from a collection of data stored on the remote storage system.

As used herein, a "remote storage system" refers to a distributed plurality of computing devices on which a collection of data is stored. For example, a remote storage system includes a plurality of server devices that are scalable according to application requirements and/or storage demands and which collectively store a collection of data for any number of end-users. In one or more embodiments, the remote storage system refers to a model of data storage in which digital data is stored in logical pools while physical storage spans multiple server devices and locations. In addition, while one or more embodiments described herein refer specifically to a cloud storage system, it will be understood that other types of remote storage systems can be used in connection with features and functionality described herein. Nevertheless, one or more features described in connection with a cloud storage system can similarly be applied to other types of remote storage systems.

As used herein, an "intermediate caching layer" refers to a plurality of data centers in communication with a remote storage system and which acts as an intermediate caching layer between the remote storage system and one or more client devices. In particular, the intermediate caching layer can include any number of data centers including respective networks of server devices within facilities at respective geographic locations. As will be described in further detail below, each data center can include a respective regional cache of data corresponding to a collection of data stored on the remote storage system.

As used herein a "regional cache" refers to any data stored on the data centers of the intermediate caching layer associated with corresponding data stored on a remote storage system. For example, in one or more embodiments, a regional cache on a data center refers to a subset of digital content items from a collection of digital content items stored on a remote storage system. In addition, each data center of the intermediate caching layer can include a respective regional cache including a similar or different subset of digital content items from the collection. In addition, the regional caches from the multiple data centers of the intermediate caching layer can collectively make up a larger subset of digital content items from the collection stored on the remote storage system.

As used herein a "digital content item" or "content item" refers to a defined portion of digital data (e.g., a data file) including, but not limited to, digital images, digital video files, digital audio files, and/or folders that include one or multiple digital content items. A digital content item can further include compressed files or reduced versions of digital content items representative of an original or full version (e.g., full-resolution version) of a digital content item. In addition, a digital content item can refer to various types of data objects including, for example, a fieldset identifier, a source map, an HTML document, a JSON object, or other discrete data object.

Additional disclosure will now be provided in connection with exemplary embodiments portrayed in the figures. For example, FIG. 1 illustrates an example environment 100 for implementing the regional storage system(s). As shown in FIG. 1, the environment 100 includes one or more remote server device(s) 102 including the remote storage system 104 thereon. As further shown, the environment 100 includes an intermediate storage layer 106. The intermediate storage layer 106 includes regional data centers 108a-c including a local data center 108a and remote data centers 108b-c. Each of the regional data centers 108a-c include a regional storage system 110 thereon. In addition, the regional data centers 108a-c include respective regional caches 112a-c stored thereon.

The environment 100 further includes a client device 114 in communication with the local data center 108a by way of a network 114. The remote server device(s) 102, data centers 108a-c, and client device 114 may be communicatively coupled with each other directly or indirectly. Moreover, the remote server device(s) 102, data centers 108a-c, and client device 114 may comprise any type of computing device (including one or more computing devices as discussed in greater detail below in relation to FIG. 8.)

Although FIG. 1 illustrates a particular number and arrangement of devices, it will be appreciated that the environment 100 can include any number of computing devices (fewer or greater than shown). For example, in one or more embodiments, the remote server device(s) 102 include a network of server devices across multiple geographic locations. In addition, in one or more embodiments, the intermediate caching layer 106 includes any number of data centers 108a-c at respective locations, each in communication with the network of remote server device(s) 102.

As just mentioned, the environment 100 includes one or more remote server device(s) 102. The remote sever device(s) 102 may generate, store, receive, and/or transmit data, including various types of digital content items. In one or more embodiments, the remote server device(s) 102 make up a cloud storage architecture including any number of remote server device(s) 102 at different locations which collectively store a collection of digital content items. For example, a collection of digital content items can include digital content items stored at different remote storage devices at different locations.

For example, the remote server device(s) 102 can host a cloud storage system on which a collection of digital content items is stored for a user, group of users, organization, or other entity associated with the client device 114. The remote storage system 104 can manage access to storage spaces including collections of digital content items associated with respective users. In particular, the remote storage system 104 can provide access to a collection of digital content items associated with a user of the client device 114. In addition, given the right credentials or permissions, the remote storage system 104 can provide access to the collection of digital content to any number of client devices associated with a user, group of users, subscribers of a service, organization, or other entity.

Further, the intermediate caching layer 106 includes a local data center 108a and remote data centers 108b-c. As used herein, a local data center refers (from the perspective of a client device) to a data center with which a given client device is connected. Alternatively, a remote data center refers to another data center in communication with the local data center, but with which the given client device is not connected (or is not located within a corresponding geographic region). As an example, a data center can act as a local data center for a first client device having access to the data center while acting as a remote data center for a second client device having access to another data center. Accordingly, a data center can act as either a local data center or a remote data center in accordance with a geographic region of a client device and/or whether the client device has access to the data center. In addition, the role of a data center can change based on a current location of a client device. For example, where the client device 114 moves from a first geographic location associated with the local data center 108a to a second geographic location associated with a different data center (e.g., a remote data center 108b), the different data center may then act as a local data center to the client device 114 while at the second geographic location.

As will be described in further detail below, each of the local data center 108a and remote data centers 108b-c can include respective networks of computing devices (e.g., server nodes) on which the regional storage systems 110 stores regional caches 112a-c including subsets of digital content items from a collection of digital content items maintained by the remote storage system 104. For example, the regional storage system 110 can store and manage access to a regional cache 112a on the local data center 108a including a subset of digital content items from a collection of digital content items.

As will be described in further detail below, the intermediate caching layer 106 facilitates quick and convenient access to regional caches 112a-c of digital content items to a requesting client device. For example, the client device 114 can provide a data request including a request for a digital content item from a collection of digital content items on a cloud storage system (e.g., the remote storage system 104) to the local data center 108a. In response, the local data center 108a can identify whether the digital content item is stored within the regional cache 112a on a server node of the local data center 108a. Based on whether the digital content item is included within the regional cache 112a, the local data center 108a can provide the digital content item to the client device 114 over the network 116.

For example, in response to receiving a request for a digital content item, the regional storage system 110 of the local data center 108a determines whether the requested digital content item exists on a regional cache 112a on the local data center 108a. If the digital content item is not found, the regional storage system 110 determines whether the digital content item exists on a regional cache 112b-c of one of the remote data centers 108b-c. If the regional storage system 110 fails to identify the digital content item on any of the data centers 108a-c of the intermediate caching layer 106, the regional storage system 110 accesses the remote storage system 104 and obtains the requested digital content item. The regional storage system 110 then stores the digital content item and associated data on the regional cache 112a of the local data center 108a and provides (e.g., via a download) the digital content item to the client device 114 over the network 116. Additional detail with regard to determining whether the digital content item exists on a regional cache as well as constructing the regional cache in response to received data requests will be described in further detail below.

Figure 2:
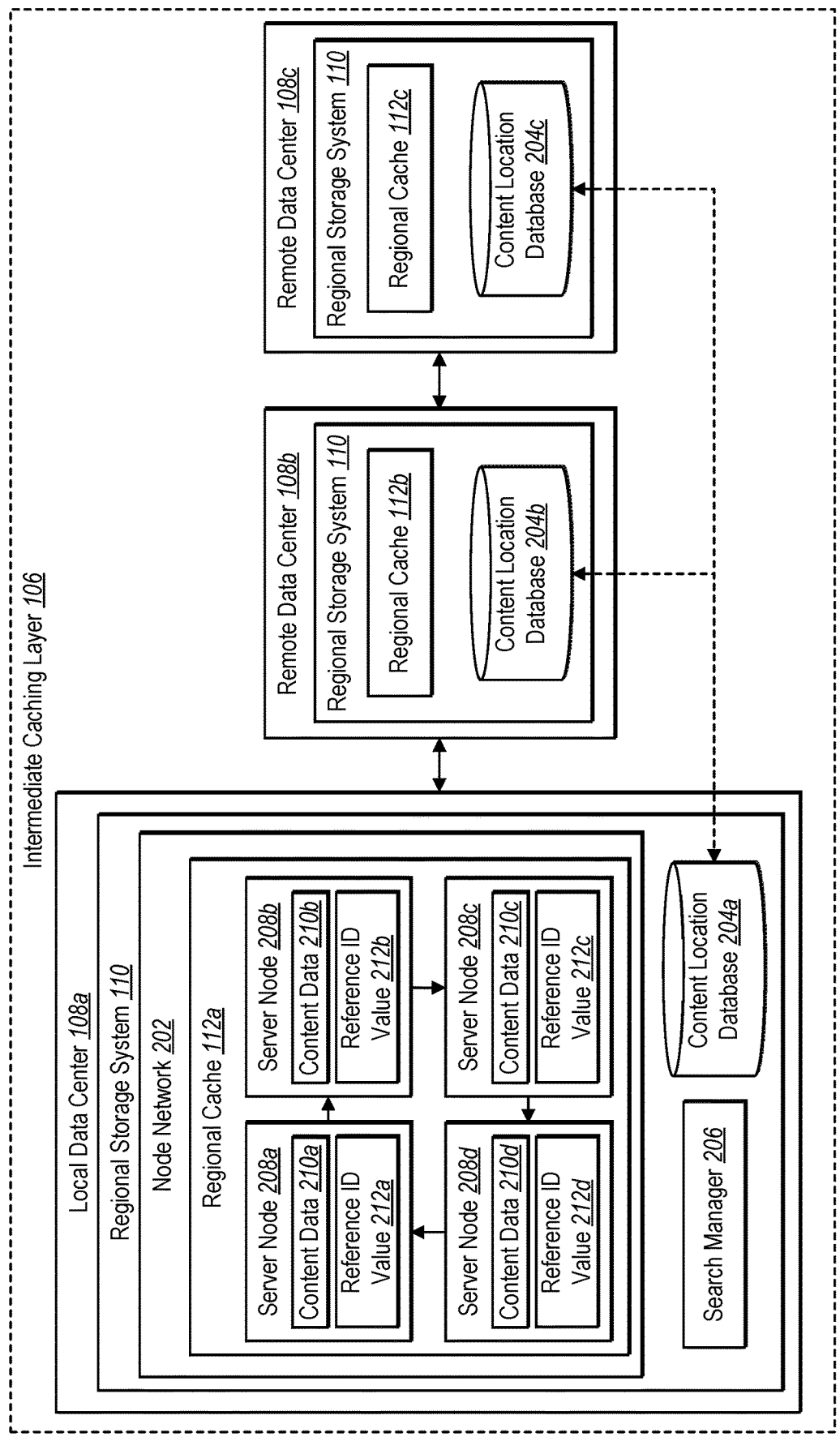
FIG. 2 illustrates a block diagram illustrating a more detailed example of an intermediate caching layer shown in FIG. 1 in accordance with one or more embodiments.

FIG. 2 illustrates a more detailed example of the intermediate caching layer 106 discussed above in connection with FIG. 1. In particular, as shown in FIG. 2, the intermediate caching layer 106 includes the local data center 108a including the regional storage system 110. The intermediate caching layer 106 further includes remote data centers 108b-c including regional storage systems 110 similar to, or the same as, the regional storage system 110 on the local data center 108a. For instance, and as described above, each of the data centers 108a-c can act as a local data center 108a for a respective client device 114 based on a geographic location of the client device 114 with respect to the data centers 108a-c of the intermediate caching layer 106. Accordingly, one or more features or components described in connection with the local data center 108a can similarly apply to any of the remote data centers 108b-c.

As shown in FIG. 2, the local data center 108a includes a node network 202, a content location database 204a, and a search manager 206. As further shown, the node network 202 includes server nodes 208a-d including content data 210a-d and reference identifier values 212a-d stored thereon. Each of the server nodes 208a-d include one or more computing devices (e.g., server storage devices). In addition, while the node network 202 shown in FIG. 2 includes four server nodes 208a-d, the node network 202 can include any number of computing nodes. Further in one or more embodiments, the regional storage system 110 includes multiple node networks each including any number of server nodes. The remote data centers 108b-c can similarly include one or multiple node networks including any number of computing nodes. Each of the server nodes 208a-d may include similar features and functionality as general computing devices discussed in further detail below in connection with FIG. 8.

As mentioned above, each of the server nodes 208a-d include content data 210a-d. The content data 210a-d can include digital content items and associated information (e.g., file data, owner data, etc.) from a collection of digital content items stored on the remote storage system 104. The content data 210a-d on the server nodes 208a-d can collectively form a regional cache 112a including a subset of digital content items from a collection of digital content items stored on the remote storage system 104.

The regional storage system 110 can store digital content items on different server nodes 208a-d in accordance with file names, file owners, file sizes, or other organizational schemes. For instance, in one or more embodiments, the regional storage system 110 stores digital content items based on a type of data. As another example, the regional storage system 110 can store the data in an order in which the regional storage system 110 receives the data from the remote storage system 104. As another example, the regional storage system 110 can store the digital content items randomly across the respective server nodes 208a-d. Alternatively, in one or more embodiments, the regional storage system 110 stores the digital content items on the server nodes 208a-d in accordance with storage capacity or based on one or more considerations for evenly distributing the digital content items across the server nodes 208a-d.

For example, where a collection of digital content items largely includes data associated with an electronic survey administered to a number of users, the regional storage system 110 can store survey responses based on types of data included within responses to the survey questions. For instance, where a number of responses include integers, the regional storage system 110 can store the responses including the integers on a first server node 208a. Alternatively, where a number of responses include strings of text, the regional storage system 110 can store the responses including the text on a second server node 208b. In this way, where a data request includes a key that designates or otherwise identifies a type of data, the regional storage system 110 can more quickly identify the server node 208a-d expected to include content data corresponding to the data request based on whichever node has been designated as storing the specific type of data.

As further shown, each of the server nodes 208a-d can have a respective reference identifier value 212a-d. In particular, in one or more embodiments, the server nodes 208a-d of the node network 202 form a hash ring including individual nodes (e.g., the server nodes 208a-d) associated with a respective hash value or ranges of hash values (e.g., the reference identifier value 212a-d). In one or more embodiments, regional storage system 110 can utilize the reference identifier values 212a-d to process a received data request (e.g., from the client device 114) and determine whether the intermediate caching layer 106 includes a digital content item matching the data request stored on one or more of the regional caches 112a-c of the different data centers 108a-c. Additional detail in connection with the node network 202 and identifying whether a digital content item of interest is located on a data center within the intermediate caching layer 106 is described in further detail below (in connection with FIG. 3).

In one or more embodiments, the regional storage system 110 utilizes the reference identifier values 212a-d to partition the server nodes 208a-d in a variety of ways. For example, the regional storage system 110 can partition the nodes by assigning reference identifier values 212a-d evenly over a predefined range of possible key values or hash values included within data requests. In one or more embodiments, the regional storage system 110 assigns the reference identifier values 212a-d to evenly partition the server nodes 208a-d in accordance with a predicted or tracked frequency of received hash values. As another example, the regional storage system 110 can assign reference identifier values 212a-d that partition the server nodes 208a-d in accordance with storage or processing capacity of the respective devices. For instance, where a first node has more storage or a higher processing capacity than a second node, the regional storage system 110 can assign reference identifier values such that a larger number of incoming data requests are handled by the first node. The regional storage system 110 can assign reference identifier values 212a-d to the server nodes 208a-d to partition the server nodes 208a-d of the node network 202 in a number of ways to more quickly or effectively handle incoming data requests.

The local data center 108a can further include a content location database 204a. The content location database 204a can include information about digital content items stored on respective server nodes 208a-d of the node network 202 (e.g., of the local data center 108a). In addition, in one or more embodiments, the content location database 204a includes information about digital content items stored on the remote data centers 108b-c. For example, the content location database 204 includes location data indicating one or more server nodes of regional caches 112b-c of the remote data centers 108b-c on which digital content items are stored. The content location database 204 can include additional information including, for example, file metadata, ownership data, encryption data, reference identifier data, etc.

In one or more embodiments, each of the remote data centers 108b-c include respective content location databases 204b-c including similar features and functionality as the content location database 204a on the local data center 108a. In one or more embodiments, the content location databases 204b-c include mirrored or identical data as the data stored on the content location database 204a. For example, in one or more embodiments, information stored on the content location database 204a is strongly consistent with the information stored on the content location databases 204b-c on the remote data centers 108b-c.

In particular, in one or more embodiments, the data stored on the content location database 204a is stored in the same order and the same state as data stored on each of the content location databases 204b-c of the remote data centers 108b-c. Alternatively, in one or more embodiments, information stored on the content location database 204a of the local data center 108a is eventually consistent with the information stored on the content location databases 204b-c on the remote data centers 108b-c. In particular, in one or more embodiments, the data stored on the content location database 204a will eventually be the same as the data stored on the content location databases 204b-c of the remote data centers 108b-c (provided no updates or modifications to the data on the content location databases 204a-c are made).

As further shown in FIG. 2, the regional storage system 110 includes a search manager 206 that processes incoming data requests for data stored on the cloud storage system. In particular, in response to receiving a data request at the local data center 108a from a client device 114, the search manager 206 can identify a reference identifier (e.g., a search key or hash key) included within or generated from the search request. Based on the reference identifier, the regional storage system 110 identifies a search node within the node network 202 having an associated reference identifier value corresponding to the reference identifier from the search request. The identified server node then acts as a search node for identifying a location of one or more digital content items corresponding to the data request.

As used herein, a "reference identifier" refers to a key or hash value that the regional storage system 110 utilizes to identify a storage location of one or more digital content items corresponding to a data request. In one or more embodiments, the reference identifier refers to a number from a known range of numbers. In addition, in one or more embodiments, the reference identifier refers to a key including a hash value or number associated with a specific digital content, type of data, source of data, or other characteristic associated with data requested by a search request. As mentioned above, and as will be described in further detail below in connection with FIG. 3, the regional storage system 110 can utilize the reference identifier from a data request to identify a specific server node having a reference identifier value closest to or otherwise corresponding to the reference identifier from the data request.

As will be described in further detail with respect to FIGS. 3-4, the regional storage system 110 enables a client device 114 to obtain quick and efficient access (e.g., low-latency access) to one or more digital content items while reducing a number of times the local data center 108a accesses the remote storage system 104. For example, in response to receiving a data request, the regional storage system 110 identifies a digital content item corresponding to the data request and determines whether the intermediate caching layer 106 includes the identified digital content item. In particular, the regional storage system 110 determines whether the node network 202 on the local data center 108a includes the digital content item or, alternatively, whether node networks on the remote data centers 108b-c include the digital content item.

Upon identifying the digital content item corresponding to a data request, the regional storage system 110 provides the digital content item to the requesting client device 114. For example, where the regional storage system 110 identifies the digital content item on a first server node 208a (or other server node on the local data center 108a), the regional storage system 110 simply provides the digital content item to the client device 114. In general, the local data center 108a (or remote data centers 108b-c) can provide the digital content item in less time than the remote storage system. Indeed, based on the dedicated processing, storage, and communication between the client device 114 and the data center 108a, the regional storage system 110 can provide the digital content item in about 20 milliseconds compared to about 600 milliseconds of the remote storage system.

In one or more embodiments, the regional storage system 110 updates access information on the content location database 204a to indicate the recent access of the digital content item and that the regional storage system provided the digital content item to the client device 114. In one or more embodiments, the regional storage system 110 pushes the update to the content location database 204a to the remote datacenters 108b-c to update corresponding content location databases 204b-c.

As another example, where the regional storage system 110 fails to identify the digital content item stored on any of the source nodes 208a-d of the node network 202 on the local data center 108a, the regional storage system 110 can access the content location database 204 to identify that another data center includes a copy of the digital content item. For example, the regional storage system 110 can identify, based on information contained within the content location database 204, that the first remote data center 108b includes a copy of the digital content item. The regional storage system 110 can request the digital content item and provide a copy to the client device 114 by way of download from the local data center 108a (e.g., over the network 116). In addition to providing the copy of the digital content item to the client device 114, the regional storage system 110 can additionally store a copy of the digital content item on the node network 202 for use in responding to subsequent data requests received at the local data center 108a. In this example, both regional caches 112a-b on the local data center 108a and the remote data center 108b will include copies of the digital content item.

Whether the regional storage system 110 identifies the digital content item on the local data center 108a, remote data centers 108b-c, or the server device(s) 102 of the remote storage system 104, upon providing a copy of the digital content item to the client device 114, the regional storage system 110 can update the content location database 204a to reflect any modifications to the regional caches on the intermediate caching layer 106. For example, where the regional storage system 110 obtains a copy of the digital content item from the remote storage system 104 and stores a copy on the regional cache 112a of the local data center 108a, the regional storage system 110 updates the content location database 204a to identify a server node on which the copy of the digital content item is stored and further provides a notification to the remote data centers 108b-c to facilitate updating data stored on the content location databases 204b-c of the remote data centers 108b-c. Alternatively, where the regional storage system 110 obtains a copy of the digital content item from another data center within the intermediate caching layer 106, the regional storage system 110 similarly stores a copy on the regional cache 112a of the local data center and updates data stored on the content location database 204a to reflect the access history and locations of copies of the digital content item within the intermediate caching layer 106.

Figure 3:
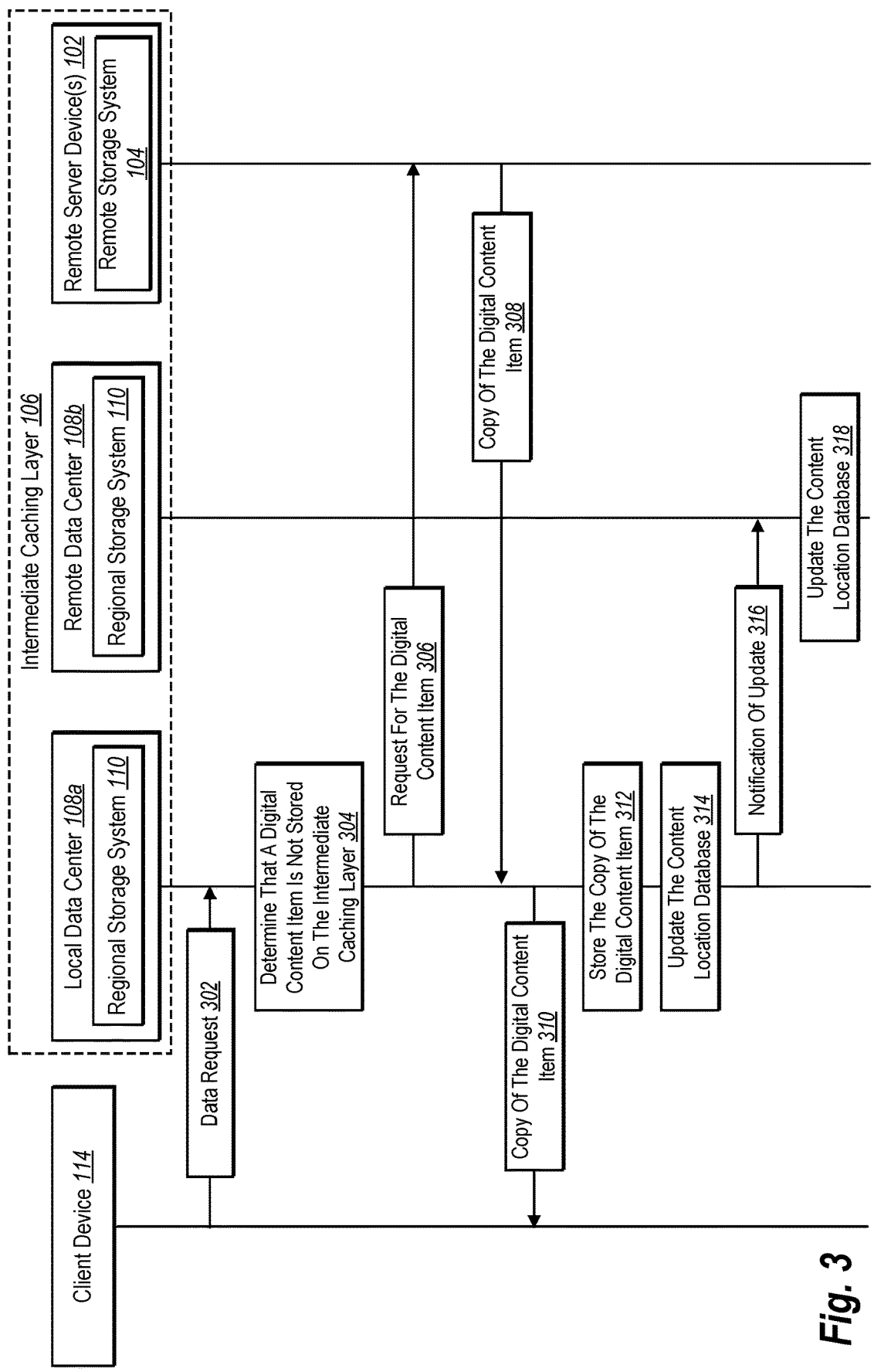
FIG. 3 illustrates a flow diagram of interactions between devices of the environment shown in FIG. 1 in accordance with one or more embodiments.

Proceeding onto FIG. 3, additional information will be provided about compiling a regional cache including a subset of digital content items from a collection of digital content items stored at a remote storage system 104 and providing access to the regional cache to one or more client devices. In particular, FIG. 3 illustrates an example series of interactions between a client device 114, local data center 108a, remote data center 108b, and a remote storage system 104 on one or more server device(s) 102.

For example, as shown in FIG. 3, the regional storage system 110 receives 302 a data request from the client device 114. For example, the client device 114 can provide a search query including a request for data corresponding to one or more digital content items from a collection of digital content items maintained on the remote storage system 104. In one or more embodiments, the data request includes an aggregate request including a request for multiple types of data. For instance, where a collection of digital content items includes electronic survey responses from a number or respondents (e.g., responding users), a data request can include a request for age and gender information associated with the respondents of the electronic survey(s).

In addition to information for identifying corresponding digital content items, in one or more embodiments, the data request includes a key or multiple keys that the regional storage system 110 can use to identify a storage location of one or more digital content items corresponding to the data request. In one or more embodiments, the regional storage system 110 receives the key in connection with the data request. Alternatively, in one or more embodiments, the regional storage system 110 receives a data request and generates a key at the local data center 108a for processing the data request.

In some embodiments, the regional storage system 110 further determines whether a requested digital content item exists on the intermediate caching layer 106. In particular, the regional storage system 110 determines whether a digital content item is stored within the intermediate caching layer 106 by determining whether a regional cache 112a on the local data center 108a includes the digital content item. The regional storage system 110 can additionally determine whether the digital content item is stored within the intermediate caching layer 106 by determining whether a regional cache 112b of the remote data center 108b includes the digital content item. As mentioned above, determining whether a regional cache includes a digital content item includes determining whether any server nodes 208a-d of a node network 202 on the local data center 108a includes the digital content item stored thereon. The regional storage system 110 can similarly determine whether a server node of a node network on the regional data center 108b includes the digital content item.

In one or more embodiments, the regional storage system 110 determines whether the digital content item exists on the intermediate caching layer 106 by utilizing one of the server nodes 208a-d of the node network 202 to process the data request. In particular, based on a reference identifier (e.g., a key) received or generated in connection with the data request, the regional storage system 110 can identify a search node from the server nodes 208a-d of the node network 202 associated with a reference identifier value 212a-d that matches or otherwise corresponds to the reference identifier from the data request. More specifically, in one or more embodiments, the node network 202 includes a hash ring including nodes associated with respective hash values. Based on a key received in connection with a data request, the regional storage system 110 identifies a location on the hash ring to identify a search node within the hash ring to execute or otherwise process the data request.

Utilizing a node network 202 in this way has a number of benefits. For example, by implementing a node network 202 including server nodes 208a-d associated with respective reference identifier values, the regional storage system 110 avoids delays caused by a single master node having limited processing capabilities attempting to process thousands of data requests within a short period of time. Indeed, by utilizing a node network 202 (e.g., a hash ring), the regional storage system 110 distributes data requests between multiple server nodes 208a-d, preventing a cascading failure as a result of a cache stampede that can occur when a master node attempts to handle all incoming data requests.

In one or more embodiments, the regional storage system 110 determines whether a digital content item referenced in the data request is located on the intermediate caching layer 106 by querying a content location database 204a consistent with a content location database 204b on the remote data center 208b. Indeed, as mentioned above, any number of data centers of the intermediate caching layer 106 can include a content location database having strong or eventual consistency with the content location database 204a on the local data center 108a. Accordingly, because the content location database 204a includes storage location data for digital content items on regional caches across multiple data centers, the identified search node can internally identify a storage location of the digital content item without querying the remote storage system 104 and/or the remote data center 108b.

In the example shown in FIG. 3, the regional storage system 110 determines 304 that the digital content item is not stored on the intermediate caching layer 106. More specifically, the regional storage system 110 determines that none of the regional caches on any of the data centers of the intermediate caching layer 106 include the digital content item(s) associated with the data request based on determining that the content location database does not include the requested digital content item. In some embodiments, the content location database of the regional storage system does include a reference to the requested digital content item, however, the content location database indicates that the digital content item is not stored within the intermediate caching layer 106 by indicating that the most recent known storage location for the digital content item is within the remote storage system 104. Accordingly, the regional storage system 110 can conclude that the digital content item is located on a particular remote server device 102 of the remote storage system 104.

As shown in FIG. 3, in response to determining that none of the regional caches include the digital content item (or multiple digital content items) associated with the data request, the regional storage system 110 provides 306 a request for digital content item to the remote server device(s) 102. In response, the remote server device(s) 102 provides 308 a copy of the digital content item 308 to the local data center 108a, as shown in FIG. 2. In one or more embodiments, the remote storage system 104 provides the copy of the digital content item while maintaining an original of the digital content item on the remote storage device(s) 102 so that the remote storage system 104 maintains a complete collection of digital content items.

As further shown in FIG. 3, upon receiving the copy of the digital content item, the regional storage system 110 provides 310 the copy of the digital content item to the client device 114. In one or more embodiments, the regional storage system 110 relays the copy of the digital content item received from the remote server device(s) 102 without requiring that the remote server device(s) 102 communicate directly with the client device 114. Alternatively, in one or more embodiments, the remote server device(s) 104 provides the copy of the digital content item to both the local data center 108a and the client device 114.

Upon receiving the copy of the digital content item, the regional storage system 110 stores 312 the copy of the digital content item on the local data center 108a, as indicated in FIG. 3. For example, the regional storage system 110 stores the copy of the digital content item on a regional cache 112a of the local data center 108a. The regional storage system 110 can store the copy of the digital content item at a particular server node of the node network 202 based on a file name, file type, data type, storage availability, or other characteristic of the digital content item.

As further shown in FIG. 3, the regional storage system 110 updates 314 the content location database 204 to reflect that a copy of the digital content item is now stored within the intermediate caching layer 106. For example, the regional storage system 110 adds content location data for the copy of the digital content item to the content location database indicating a server node storing the copy of the digital content item. In addition, the regional storage system 110 adds information associated with a date and time that the digital content item was most recently accessed and/or provided to the client device 114.

The regional storage system 110 can further provide 316 a notification of the update to the remote data center 108b. In particular, the regional storage system 110 can push any changes to the content location database 104a on the local data center 108a to the remote data center 108b to enable the data center 108b to similarly update a content location database 204b on the remote data center 108b (see FIG. 2). In response, the remote data center 108b updates 318 the content location database 204b on the remote data center 108b. In one or more embodiments, the regional storage system 110 similarly provides a notification of the update to the content location database 204a to all remote data centers of the intermediate caching layer 106 such that all content location databases 204 across the intermediate caching layer can have consistent content location data at each of the data centers 108a-c.

The regional storage system 110 can utilize the process shown in FIG. 3 to construct a regional cache 112a on the local data center 108a. In addition, each of the remote data centers 108b-c can similarly construct regional caches 112b-c in response to data requests for various digital content items from other client devices. As the regional storage system 110 constructs the regional cache 112a to include more and more digital content items, the regional storage system 110 can reduce a number of times that the client device 114 and/or local data center 108a requests access to the remote storage system 104. In addition, as the remote data centers 108b-c similarly construct regional caches 112b-c, the regional storage system 110 can leverage the regional caches 112b-c of the remote data centers 108b-c in addition to the regional cache on the local data center 108a to further limit a number of times that the client device 114 and/or local data center 108a directly accesses the remote storage system 104.

As noted above, the regional storage system 110 maintains a regional cache 108a that includes a subset of digital content items from a larger collection of digital content items maintained by the remote storage system 104. Indeed, because the local data center 108a includes limited space on the node network 202, the storage capacity of the local data center 108a may fill up over time and after numerous amounts of data requests. In one or more embodiments, the regional storage system 110 removes digital content items from the regional cache 112a to make room for more recently accessed digital content items.

Accordingly, in one or more embodiments, the regional cache 112a reflects a subset of digital content items most recently accessed by the local data center 108a. Moreover, where a digital content item exists on the regional cache 112a and is subsequently provided in response to a data request, the regional storage system 110 can update the content location database 204a to reflect the most recent access of the digital content item. By updating the content location database 204a in this way, the regional storage system 110 prevents removal of a recently accessed digital content item from the regional cache 112a in favor of less recently accessed digital content items that were nonetheless received from the remote storage system 104, but were less recently accessed. Accordingly, the regional storage system 110 can purge digital content items within the regional cache 112a based on how recently the digital content items were included with a data request from a client device.

In addition to generally compiling a regional cache 112a by accessing digital content items from the remote storage system 104, the regional storage system 110 can additionally generate and/or add to a regional cache 112a of the local data center 108a based on digital content items identified on other regional caches 112b-c of the intermediate caching layer 106. For example, FIG. 4 illustrates an example series of interactions between a client device 114, local data center 108a, and a first remote data center 108b in which the regional storage system 110 adds to the regional cache 112a from the regional cache 112b of the remote data center 108b.

Figure 4:
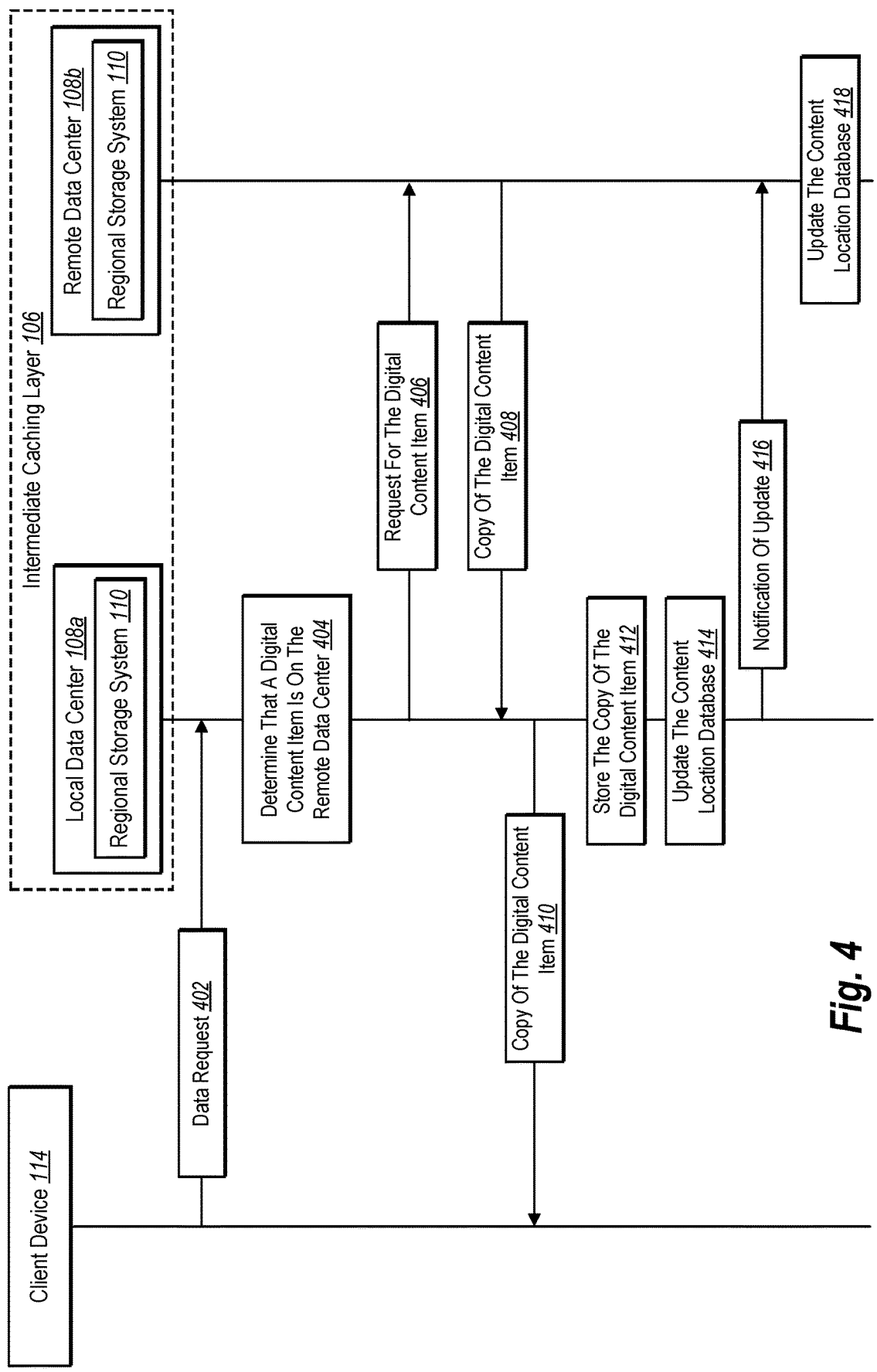
FIG. 4 illustrates a flow diagram of interactions between devices of the environment shown in FIG. 1 in accordance with one or more embodiments.

For example, as shown in FIG. 4, the regional storage system 110 receives 402 a data request including a request for a digital content item. Similar to the data request described above in connection with FIG. 3, the data request can similarly include a reference identifier (e.g., a key) the regional storage system 110 utilizes to identify a location of the requested digital content item. Similar to the example described above in connection with FIG. 3, in response to receiving the data request, the regional storage system 110 can determine whether the intermediate caching layer 106 includes the requested digital content item at any of the data centers that make up the intermediate caching layer 106.

In the example of FIG. 4, the regional storage system 110 determines that the digital content item is on the remote data center 108b. For example, upon identifying that a regional cache 112a of the local data center 108a does not include the digital content item, the regional storage system 110 can query the content location database 204a to determine that the regional cache 112b on the remote data center 108b includes the digital content item.

Based on determining that the remote data center 108b includes the digital content item, the regional storage system 110 provides 406 a request for the digital content item to the remote data center 108b, as illustrated in FIG. 4. In particular, as an alternative to accessing the remote server device(s) 102 to access the requested digital content item, the regional storage system 110 requests access to the regional cache 112b of the remote data center 108b upon identifying that the regional cache 112b of the remote data center 108b includes the digital content item. In response, the remote data center 108b (e.g., the regional storage system 110 on the remote data center 108b) provides 408 a copy of the digital content item, which is received at the local data center 108a.

As further illustrated in FIG. 4, based upon receiving the copy of the digital content item, the regional storage system 110 provides 410 the copy of the digital content item to the client device 114 in accordance with the data request. As further shown, the regional storage system 110 stores 412 the copy of the digital content item on the regional cache 112a of the local data node 108a. The regional storage system 110 also updates 414 the content location database 204a of the local data center 108a. The regional storage system 110 further provides 416 a notification of the update to the remote data center 108b. In addition, the regional storage system 110 of the remote data center 108b updates the content location database 204b on the remote data center 108b. The regional storage system 110 can similarly push updates to any number of content location databases across data centers of the intermediate caching layer 106.

In one or more embodiments, providing 410 the copy, storing 412 the copy, updating 414 the content location database 204a, providing 416 the notification of the update 416, and updating 418 the content location database 204b are performed similarly as corresponding steps described above in connection with FIG. 3. In addition, with regard to updating the content location database 204b on the remote data center 108b, in one or more embodiments, the regional storage system 110 on the remote data center 108b immediately updates the content location database 204b on the remote data center 108b upon receiving the request for the digital content item and providing the copy of the digital content item to the local data center 108a. Further in one or more embodiments, the remote data center 108b pushes notifications of the updated content location database 204b to one or more additional data centers of the intermediate caching layer 106.

While FIG. 4 illustrates an example in which a digital content item is stored on a local data center 108a, the regional storage system 110 can use similar principles and features to store copies of the digital content item across any number of remote data centers. For example, while FIG. 4 illustrates updating the content location database of the illustrated remote data center 108b, the regional storage system 110 may provide location information on stored copies of the digital content item on both the local data center 108a and the remote data center 108b such that another remote storage system 110, upon receiving a request from another client device for the digital content item, can perform a similar process to obtain a copy of the digital content item for immediate access to nearby client devices.

Further, while FIGS. 3 and 4 illustrate examples in which the regional storage system 110 adds digital content items to the regional cache 112a one digital content item at a time, in one or more embodiments, the regional storage system 110 can migrate a number of digital content items to the regional cache 112a upon detecting one or more data requests for a related group of digital content items. For example, where the regional storage system 110 receives a number of data requests for digital content items from a folder (or other defined group) of digital content items, rather than waiting for a request for each digital content item from the folder, the regional storage system 110 can identify the related digital content items and add the related digital content items to the regional cache 112a in anticipation of future requests. The content location databases 204 can are then updated accordingly.

As an illustrative example, where a user or group of users move from a first location associated with a first data center to a second location associated with a second data center, the second data center will likely become the local data center for client devices at the second or new location. Accordingly, where a regional cache at the first location likely represents a cache of frequently (or recently) accessed digital content items, the second data center will likely provide multiple requests over a period of time to the first data center requesting copies of digital content items from the regional cache of the first data center. Therefore, while the second data center can obtain digital content items from the regional cache of the first data center faster and at a lower cost than accessing a remote storage system, the regional storage system 110 may nonetheless benefit from migrating at least a portion of the regional cache from the first data center to the regional cache at the second data center.

In this example, the regional storage system 110 may detect a threshold number of requested digital content items found on the regional cache of the first data center that are not found on the regional cache of the second data center and determine to migrate files from the first data center to the second data center based on the number of requested digital content items meeting the threshold. Accordingly, the regional storage system 110 on the second data center can request multiple related files (e.g., without receiving a specific data request from a client device indicating the related files) from the first data center and migrate the related files to the regional cache of the second data center corresponding to the current location of the user or group of users.

In one or more examples described above, the regional storage system 110 identifies one or more digital content items found on a data center 108a-c of the intermediate caching layer 106 or, alternatively, one or more digital content items found on the remote storage system 104. Nevertheless, in one or more embodiments, a data request may include a reference to multiple digital content items found at a number of different locations. For example, a data request may include a request for a first digital content item found on the regional cache 112a of the local data center 108a, a second digital content item found on a regional cache 112b of a first remote data center 108b, and a third digital content item not found on the intermediate caching layer 106 (e.g., stored on the remote storage system).

In response, the regional storage system 110 may locate and provide copies of the first and second digital content items from the intermediate caching layer (e.g., without accessing the remote storage system 104) while accessing the remote storage system 104 for the third digital content item. While locating and obtaining a copy of the third digital content item from the remote storage system 104 would take more time and have a higher cost than retrieving the copies of the first and second digital content items from the intermediate cache layer, the regional storage system 110 nonetheless reduces the total overall time and cost associated with processing the received data request by avoiding direct access to the remote storage system 104 to obtain the first and second digital content items.

The regional storage system 110 can additionally manage edits or versions of digital content items stored on respective regional caches 112a-c of the intermediate caching layer 106. For example, as mentioned above, as digital content items are added to a regional cache, in one or more embodiments, the regional storage system 110 removes older digital content items and/or redundant digital content items from the regional cache to accommodate storage for those digital content items more frequently or recently accessed as well as more recent versions of respective digital content items. Accordingly, in one or more embodiments, a regional cache includes a subset of recently recalled or frequently accessed digital content items from a collection stored on the remote storage system 104.

Figure 5A:
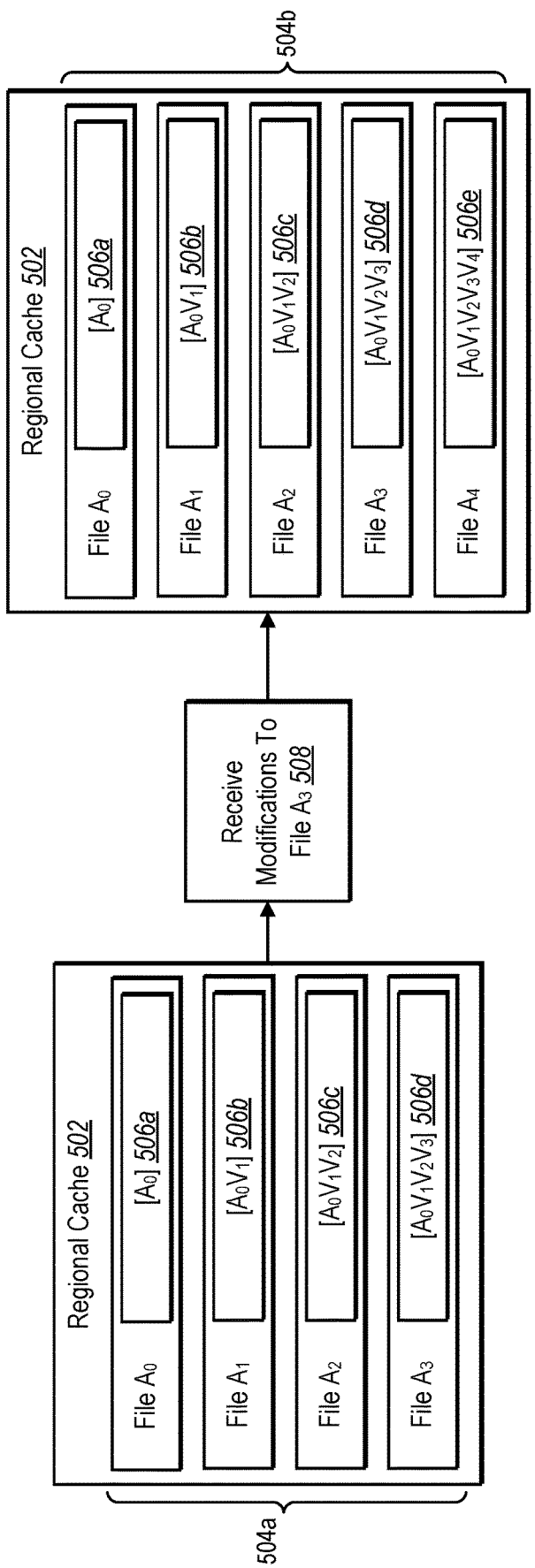
FIGS. 5A-5B illustrate example updates to a regional cache based on received modifications to a digital content item in accordance with one or more embodiments.

In addition, in one or more embodiments, the regional storage system 110 manages versions of digital content items as the regional storage system 110 receives edits or other modifications to the digital content items from the regional cache. For example, FIG. 5A illustrates an example in which the regional storage system 110 stores and manages multiple versions of a digital content item on a regional cache 502 (e.g., of a local data center). In particular, FIG. 5A illustrates an example regional cache 502 including a set of versions 504a representative of a series of received edits made with respect to copies of a digital content item provided to a client device.

For example, the first set of versions 504a includes File $A_0$ having a corresponding file identifier $[A_0]$ 506a including a name or number associated with File $A_0$. As further shown, the first set of versions 504a includes File $A_1$ having a corresponding file identifier $[A_0V_1]$ 506b indicating that File $A_1$ refers to a first modification of File $A_0$. In particular, upon receiving or detecting a modification of File $A_0$, the regional storage system 110 can store a modified copy of File $A_0$ (e.g., File $A_1$) and generate a version identifier $[V_1]$ to append to the file identifier $[A_0]$ resulting in a file identifier $[A_0V_1]$ 506b for the modified copy of File $A_0$ including both the file identifier $[A_0]$ 506a for File $A_0$ and the version identifier specific $[V_1]$ to the first modified identifier. As shown in FIG. 5A, the regional storage system 110 maintains a copy of both the original file (File $A_0$) and the first modified copy of the file (File $A_1$).

The regional storage system 110 can generate the version identifier $[V_1]$ in a number of ways. For example, the regional storage system 110 can generate a random number and append the random number to the file identifier $[A_0]$. The random number can include any random number of a predefined range large enough to ensure a high probability that no conflict would exist between a version identifier associated with a first modification of the File $A_0$ and a second modification of the same File $A_0$. For example, where two users simultaneously access the same file and apply edits, the regional storage system 110 can assign different random numbers for respective version identifiers to append to the file identifier for the accessed copy.

The regional storage system 110 can similarly receive modifications and generate version identifiers based on any number of received modifications to copies of a digital content item. For example, as shown in FIG. 5A, the regional storage system 110 can generate a modified copy of File $A_1$ (File $A_2$) and generate a version identifier $[V_2]$ to append to the file identifier $[A_0V_1]$ 506b corresponding to File $A_1$ resulting in a file identifier $[A_0V_1V_2]$ 506c corresponding to File $A_2$. Based on received edits for File $A_2$, the regional storage system 110 can similarly generate a modified copy of File $A_2$ (File $A_3$), and generate a version identifier $[V_3]$ to append to the file identifier $[A_0V_1V_2]$ 506c corresponding to File $A_2$ resulting in a file identifier $[A_0V_1V_2V_3]$ 506d. As indicated in FIG. 5A, the regional cache 502 can include copies for each of the file versions 504a stored thereon.

As further shown, the regional storage system 110 receives 508 modifications to File $A_3$. In response, the regional storage system 110 generates a modified copy of File $A_3$ (File $A_4$) and generates yet another version identifier $[V_4]$ including a random number from a predefined range of numbers. The regional storage system 110 appends the version identifier $[V_4]$ to the file identifier $[A_0V_1V_2V_3]$ 506d of the modified copy to generate a new version identifier $[A_0V_1V_2V_3V_4]$ 506e corresponding to the most recent copy. Accordingly, as shown in FIG. 5A, the regional cache 502 includes a modified list of versions 504b including the most recent modified copy of the file.

Figure 5B:
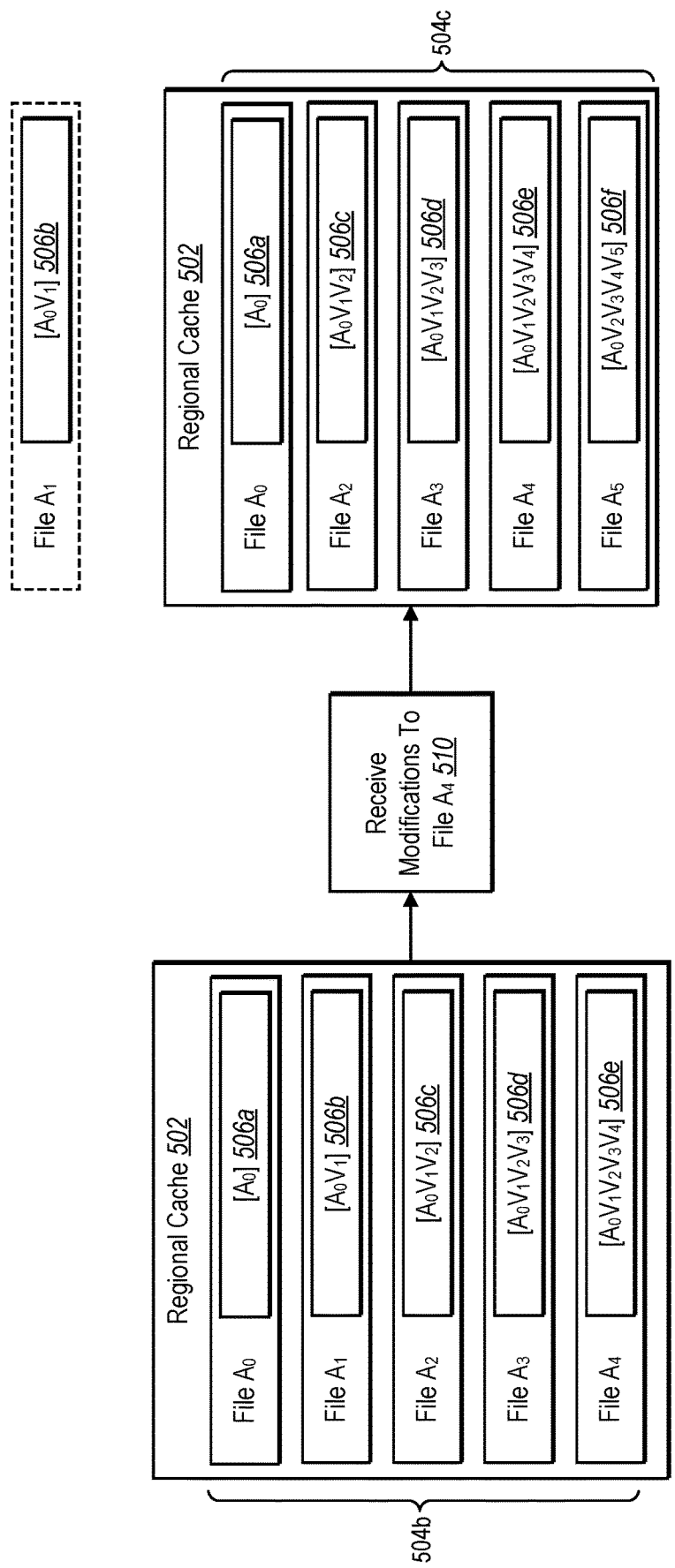

As further show in FIG. 5B, the regional storage system 110 receives 510 modifications to File $A_4$. In response, the regional storage system 110 generates a modified copy of File $A_4$ (File $A_5$) and generates yet another version identifier $[V_5]$ including a random number from the predefined range of numbers. In one or more embodiments, the regional storage system 110 limits a number of version identifiers appended to the file identifier. Accordingly, where a threshold number of version identifiers is four rather than simply appending $[V_5]$ to the file identifier $[A_0V_1V_2V_3V_4]$ 506e, the regional storage system 110 removes the oldest version identifier [$V_1$] from the previous file identifier and appends a new version identifier [$V_5$] to the end of the most recent version identifier resulting in a new version identifier [$A_0V_2V_3V_4V_5$] 506f corresponding to the most recent copy of the file. As shown in FIG. 5B, the regional cache 502 includes a resulting list of versions 504c including the most recent modified copy of the file (File $A_5$) having version identifiers [$A_0V_2V_3V_4V_5$].

In one or more embodiments, the regional storage system 110 maintains a predefined number of versions corresponding to modified copies of a digital content item. For example, as shown in FIG. 5B, in addition to limiting a number of appended version identifiers to four, the regional storage system 110 can similarly limit a number of modified copies stored on the regional cache 502. For example, in response to determining that the regional cache 502 includes a threshold number of file versions 504c, the regional storage system 110 removes the least recent modified file (File $A_1$) from the regional cache 502. Accordingly, if the data center storing the regional cache 502 were to receive a data request that specifically identified a version of the file corresponding to File $A_1$, the regional storage system 110 would provide File $A_1$ by accessing a remote storage system 104 to obtain access to File $A_1$.

FIGS. 1-5, the corresponding text, and example, provide a number of different systems and devices that facilitate low-latency access to a collection of remotely stored data by way of an intermediate caching layer between a client device and a remote storage system. In addition to the foregoing, embodiments can also be described in terms of flowcharts including acts and steps in a method for accomplishing a particular result. For example, FIGS. 6-7 illustrate flowcharts of exemplary methods and acts in accordance with one or more embodiments.

Figure 6:
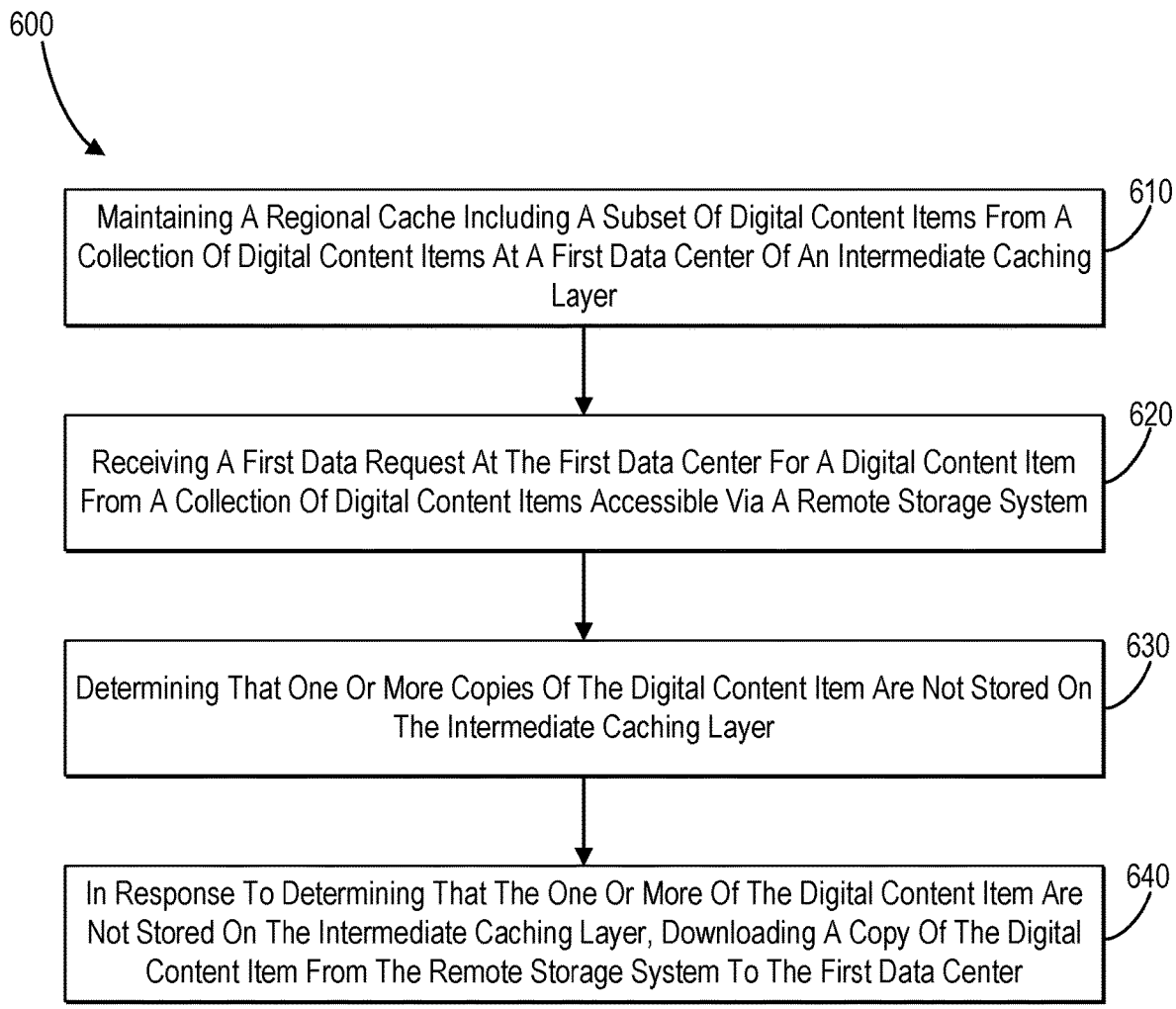
FIG. 6 illustrates a flowchart of a series of acts in an example method for generating a regional cache and providing access to the regional cache in accordance with one or more embodiments.
Figure 7:
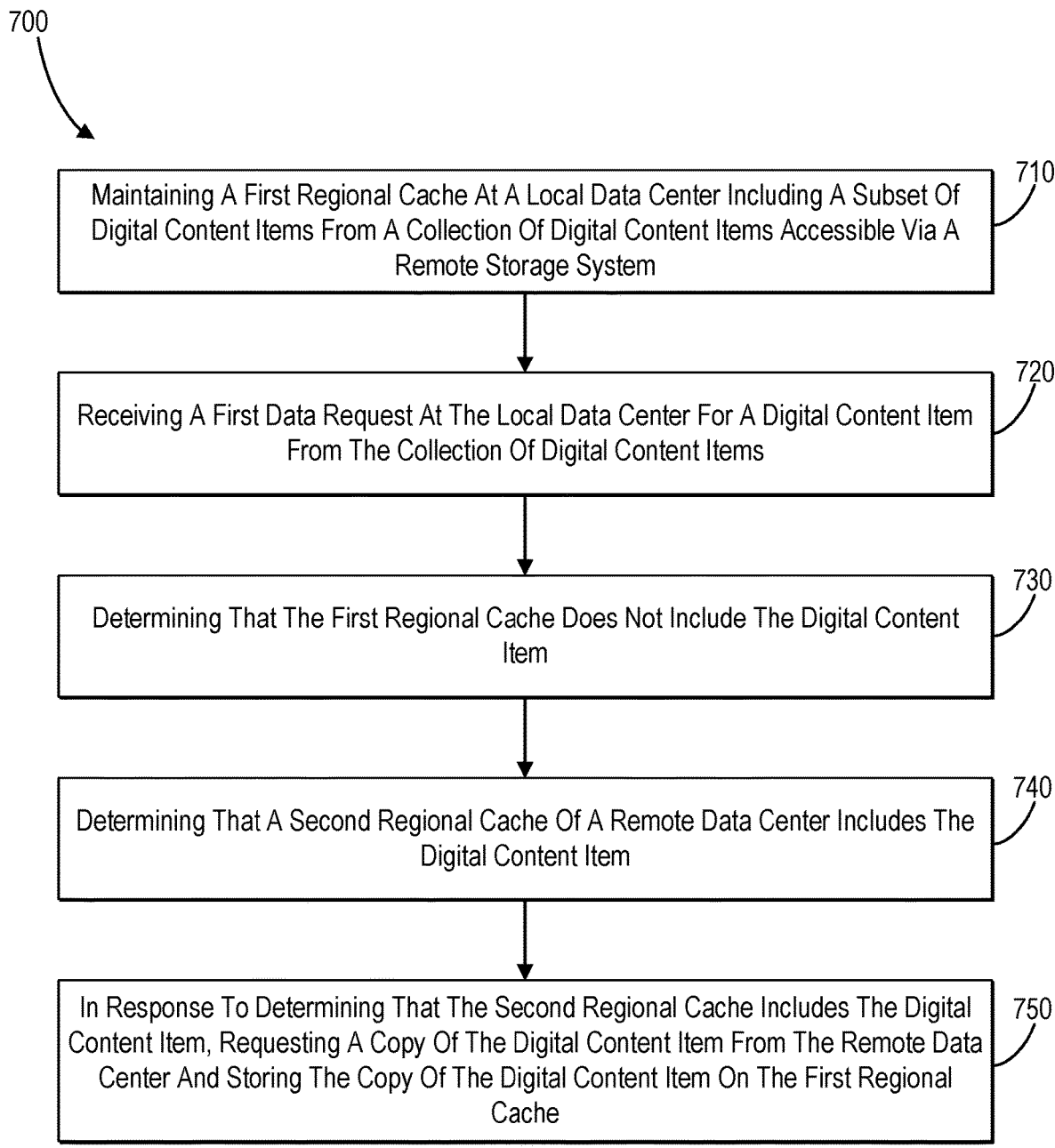
FIG. 7 illustrates a flowchart of a series of acts in another example method for generating a regional cache and providing access to the regional cache in accordance with one or more embodiments.

For example, FIG. 6 illustrates a series of acts 600 including an act 610 of maintaining a regional cache (e.g., regional caches 112a-c) including a subset of digital content items from a collection of digital content items at a first data center of an intermediate caching layer 106. For example, in one or more embodiments, the act 610 includes maintaining, at a first data center (e.g., local data center 108a) of an intermediate caching layer 106 between a client device 114 and a remote storage system 104, a regional cache including a subset of digital content items from a collection of digital content items accessible via the remote storage system 104, the intermediate caching layer 106 including a plurality of data centers (e.g., local data center 108a and remote data centers 108b-c). In one or more embodiments, the plurality of data centers each include a content location database (e.g., content location databases 204a-c) including content identification data corresponding to the collection of digital content items where the content identification data is mirrored across each of the content location databases at the plurality of data centers.

As further shown in FIG. 6, the series of acts 600 includes an act 620 of receiving a first data request at the first data center for a digital content item from a collection of digital content items accessible via a remote storage system 104. For example, in one or more embodiments, the act 620 includes receiving, at the first datacenter, a first data request comprising a reference identifier associated with a digital content item from the collection of digital content items accessible via the remote storage system 104.

As further shown in FIG. 6, the series of acts 600 includes an act 630 of determining that one or more copies of the digital content item are not stored on the intermediate caching layer 106. For example, in one or more embodiments, the act 630 includes determining, based on the reference identifier, that one or more copies of the digital content item are not stored on one or more data centers of the intermediate caching layer 106. In one or more embodiments, determining that the one or more copies of the digital content item are not stored on the one or more of the plurality of data centers of the intermediate caching layer 106 includes determining that the reference identifier associated with the digital content item is not found on the content location database of the first datacenter.

As further shown in FIG. 6, the series of acts 600 includes an act 640 of downloading, in response to determining that the one or more of the digital content item are not stored on the intermediate caching layer 106, a copy of the digital content item from the remote storage system to the first data center. For example, in one or more embodiments, the act 640 includes in response to determining that the one or more copies of the digital content item are not stored on the one or more data centers of the plurality of data centers of the intermediate caching layer 106: accessing the digital content item via the remote storage system 104 and storing a copy of the digital content item on the regional cache maintained at the first data center of the intermediate caching layer 106. In one or more embodiments, the series of acts 600 further includes updating the content location database to include content identification data corresponding to the copy of the digital content item on the regional cache maintained at the first datacenter.

In one or more embodiments, the series of acts 600 includes receiving, from the client device, a modified copy of the digital content item. In addition, the series of act 600 can include storing the modified copy of the digital content item on the regional cache of the first datacenter. Moreover, the series of acts 600 can include updating the content location database to include content identification data corresponding to the modified copy of the digital content item. In one or more embodiments, updating the content location database to include content identification data includes generating a version identifier associated with the modified copy of the digital content item, the version identifier including a random number. In addition, in one or more embodiments, updating the content location database includes appending the version identifier to a file identifier corresponding to the digital content item.

In one or more embodiments, the series of acts 600 includes receiving, at the first datacenter, a second data request including the reference identifier associated with the digital content item. In addition, in one or more embodiments, the series of acts 600 includes determining, based on the reference identifier associated with the digital content item, that the copy of the digital content item is stored on the regional cache of the first datacenter. Further, in one or more embodiments, the series of acts 600 includes providing, from the datacenter and without accessing the digital content item via the remote storage system 104, the copy of the digital content item to the client device in response to receiving the second data request.

In one or more embodiments, the first datacenter includes a plurality of networked nodes associated with corresponding reference identifier values. In addition, in one or more embodiments, determining that the one or more copies of the digital content item are not stored on the one or more of the plurality of datacenters of the intermediate caching layer 106 includes identifying a search node from the plurality of networked nodes associated with a reference identifier value corresponding to the reference identifier from the first data request. Determining that the one or more copies of the digital content item are not stored on the one or more of the plurality of datacenters of the intermediate caching layer 106 can further include utilizing the search node to determine that one or more copies of the digital content item are not stored on one or more of the plurality of datacenters of the intermediate caching layer.

In one or more embodiments, the series of acts 600 includes determining that the regional cache has insufficient storage space to store the digital content item. In response to determining that the regional cache has insufficient storage space, the series of acts 600 can include identifying one or more digital content items for removal from the regional cache that have been accessed less recently than other digital content items from the regional cache. Moreover, in one or more embodiments, the series of acts 600 includes storing the copy of the digital content item on the regional cache after removing the one or more digital content items.

In one or more embodiments, the series of acts 600 includes receiving, from the client device 114, modifications to a recent copy of the digital content item, the recent copy of the digital content item including a file identifier where the file identifier includes an identifier associated with an original copy of the digital content item and one or more version identifiers associated with previous modifications made to the original copy of the digital content item. The series of acts 600 can further include storing, on the first data center, a modified copy of the digital content item including the received modifications. In one or more embodiments, the series of acts 600 includes generating a version identifier including a random number associated with the received modifications to the recent copy of the digital content. In addition, in one or more embodiments, the series of acts 600 includes generating a new file identifier associated with the modified copy of the digital content item, the new file identifier including the file identifier of the recent copy and the version identifier appended to the file identifier of the recent copy.

In one or more embodiments, generating the new file identifier includes determining that file identifier of the recent copy of the digital content item includes a number of version identifiers equal to a threshold number of version identifiers. In addition, generating the new file identifier can include removing a least recent version identifier from the one or more version identifiers associated with previous modifications made to the original copy of the digital content item. In one or more embodiments, the series of acts includes removing a copy of the digital content item from the regional cache of the first data center corresponding to the least recent version identifier.

FIG. 7 illustrates another example series of acts 700 including an act 710 of maintaining a first regional cache at a local data center (e.g., local data center 108a) including a subset of digital content items from a collection of digital content items accessible via a remote storage system 104. For example, in one or more embodiments, the act 710 includes maintaining, at a local data center of an intermediate caching layer 106 between a client device 114 and a remote storage system 104, a first regional cache including a subset of digital content items from a collection of digital content items accessible via the remote storage system 104, the intermediate caching layer 106 including the local data center and a plurality of remote data centers (e.g., remote data centers 108b-c).

As further shown in FIG. 7, the series of acts 700 includes an act 720 of receiving a first data request at the local data center for a digital content item from the collection of digital content items. For example, in one or more embodiments, the act 720 includes receiving, at the local data center, a first data request including a reference identifier associated with a digital content item from the collection of digital content items accessible via the remote storage system 104.

As further shown in FIG. 7, the series of acts 700 includes an act 730 of determining that the first regional cache does not include the digital content item. For example, in one or more embodiments, the act 730 includes determining that the first regional cache of the local data center does not include the digital content item.

As further shown in FIG. 7, the series of acts 700 includes an act 740 of determining that a second regional cache of a remote data center includes the digital content item. For example, in one or more embodiments, the act 740 includes determining that a second regional cache of a remote data center of the plurality of remote data centers includes the digital content item.

As further shown in FIG. 7, the series of acts 700 includes an act 750 of requesting, in response to determining that the second regional cache includes the digital content item, a copy of the digital content item from the remote data center and storing the copy of the digital content item on the first regional cache. For example, in response to determining that the second regional cache includes the digital content item and that the first regional cache does not include the digital content item, the act 750 can include requesting a copy of the digital content item from the remote data center without accessing the remote storage system and storing the copy of the digital content item on the first regional cache of the local data center.

In one or more embodiments, the series of acts 700 includes receiving a second data request for one or more additional digital content items from the collection of digital content items. The series of acts 700 can further include determining that the second regional cache of the remote data center includes the one or more additional digital content items. In addition, in one or more embodiments, the series of acts 700 includes determining, based on identifying that the second regional cache includes the digital content item associated with the first data request and the one or more additional digital content items associated with the second data request, that the second regional cache includes one or more related digital content items to the digital content item and the one or more additional digital content items.

In one or more embodiments, the series of acts 700 further includes migrating the one or more related digital content items from the second regional cache to the first regional cache of the local data center in response to determining that the second regional cache includes the one or more related digital content items. In one or more embodiments, the local data center and the plurality of remote data centers each include a content location database including content identification data corresponding to the collection of digital content items where the content identification data is mirrored across each of the local data center and the plurality of remote data centers. In one or more embodiments, the series of acts 700 includes updating the content location database to include content identification data corresponding to the copy of the digital content item that identifies the copy of the digital content item on the first regional cache and the second regional cache.

In one or more embodiments, the local data center includes a plurality of network nodes associated with corresponding reference identifier values. Furthermore, in one or more embodiments, determining that the second regional cache of the remote data center of the plurality of remote data centers includes the digital content item includes identifying a search node from the plurality of networked nodes associated with a reference identifier value corresponding to the reference identifier from the first data request and utilizing the search node to determine that the second regional cache includes a copy of the digital content item.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 8:
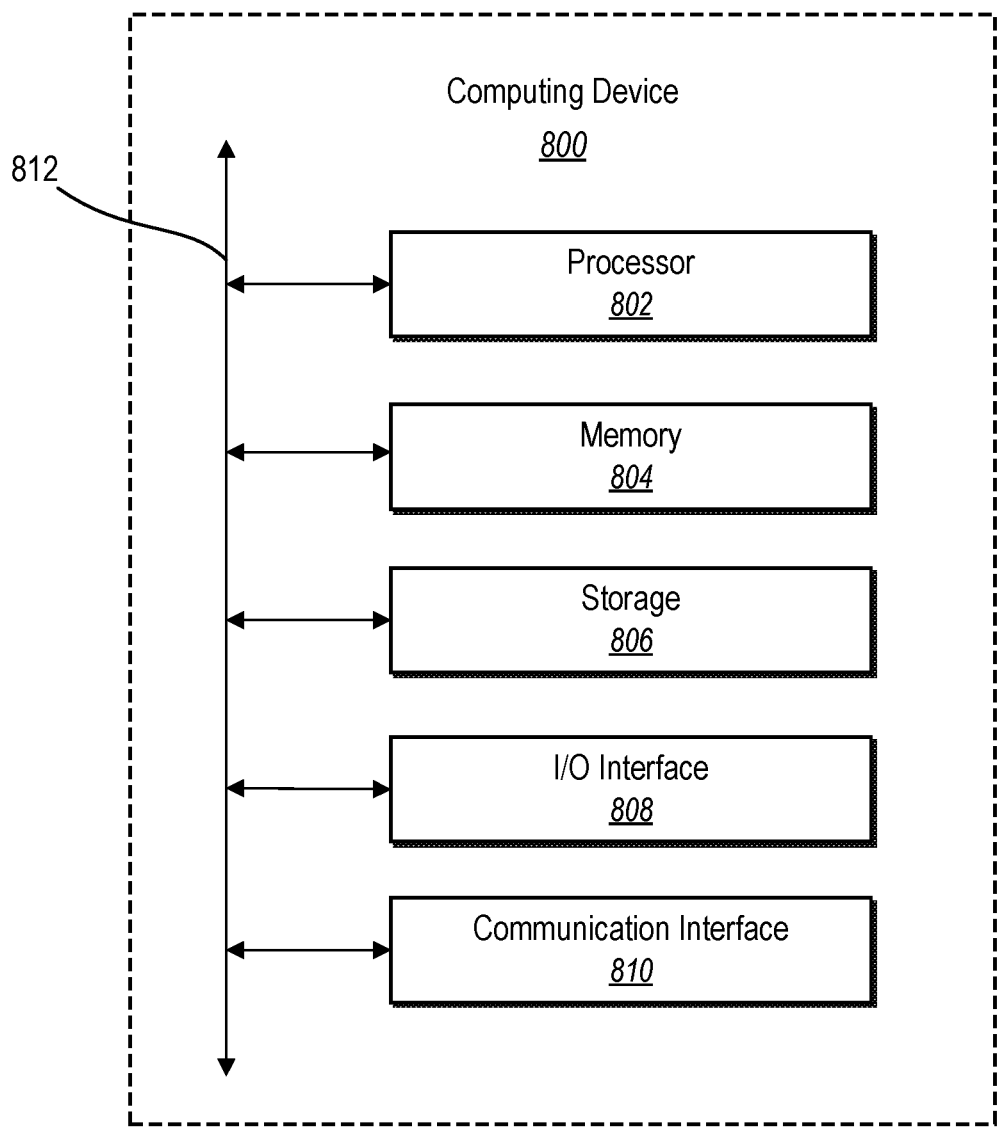
FIG. 8 illustrates a block diagram of a computing device in accordance with one or more embodiments.

FIG. 8 illustrates a block diagram of exemplary computing device 800 that may be configured to perform one or more of the processes described above. One will appreciate that one or more computing devices such as the computing device 800 may be implemented by the server device(s) 102 and/or other devices described above in connection with FIG. 1. As shown by FIG. 8, the computing device 800 can comprise a processor 802, a memory 804, a storage device 806, an I/O interface 808, and a communication interface 810, which may be communicatively coupled by way of a communication infrastructure 812. While an exemplary computing device 800 is shown in FIG. 8, the components illustrated in FIG. 8 are not intended to be limiting. Additional or alternative components may be used in other embodiments. Furthermore, in certain embodiments, the computing device 800 can include fewer components than those shown in FIG. 8. Components of the computing device 800 shown in FIG. 8 will now be described in additional detail.

In one or more embodiments, the processor 802 includes hardware for executing instructions, such as those making up a computer program. As an example and not by way of limitation, to execute instructions, the processor 802 may retrieve (or fetch) the instructions from an internal register, an internal cache, the memory 804, or the storage device 806 and decode and execute them. In one or more embodiments, the processor 802 may include one or more internal caches for data, instructions, or addresses. As an example and not by way of limitation, the processor 802 may include one or more instruction caches, one or more data caches, and one or more translation lookaside buffers (TLBs). Instructions in the instruction caches may be copies of instructions in the memory 804 or the storage 806.

The memory 804 may be used for storing data, metadata, and programs for execution by the processor(s). The memory 804 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 804 may be internal or distributed memory.

The storage device 806 includes storage for storing data or instructions. As an example and not by way of limitation, storage device 806 can comprise a non-transitory storage medium described above. The storage device 806 may include a hard disk drive (HDD), a floppy disk drive, flash memory, an optical disc, a magneto-optical disc, magnetic tape, or a Universal Serial Bus (USB) drive or a combination of two or more of these. The storage device 806 may include removable or non-removable (or fixed) media, where appropriate. The storage device 806 may be internal or external to the computing device 800. In one or more embodiments, the storage device 806 is non-volatile, solid-state memory. In other embodiments, the storage device 806 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 808 allows a user to provide input to, receive output from, and otherwise transfer data to and receive data from computing device 800. The I/O interface 808 may include a mouse, a keypad or a keyboard, a touch screen, a camera, an optical scanner, network interface, modem, other known I/O devices or a combination of such I/O interfaces. The I/O interface 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 808 is configured to provide graphical data to a display for presentation to a user. The graphical data may be representative of one or more graphical user interfaces and/or any other graphical content as may serve a particular implementation.

The communication interface 810 can include hardware, software, or both. In any event, the communication interface 810 can provide one or more interfaces for communication (such as, for example, packet-based communication) between the computing device 800 and one or more other computing devices or networks. As an example and not by way of limitation, the communication interface 810 may include a network interface controller (NIC) or network adapter for communicating with an Ethernet or other wire-based network or a wireless NIC (WNIC) or wireless adapter for communicating with a wireless network, such as a WI-FI.

Additionally or alternatively, the communication interface 810 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 810 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 810 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MIMS"), radio frequency ("RF") signaling technologies, Long Term Evolution ("LTE") technologies, wireless communication technologies, in-band and out-of-band signaling technologies, and other suitable communications networks and technologies.

The communication infrastructure 812 may include hardware, software, or both that couples components of the computing device 800 to each other. As an example and not by way of limitation, the communication infrastructure 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 9:
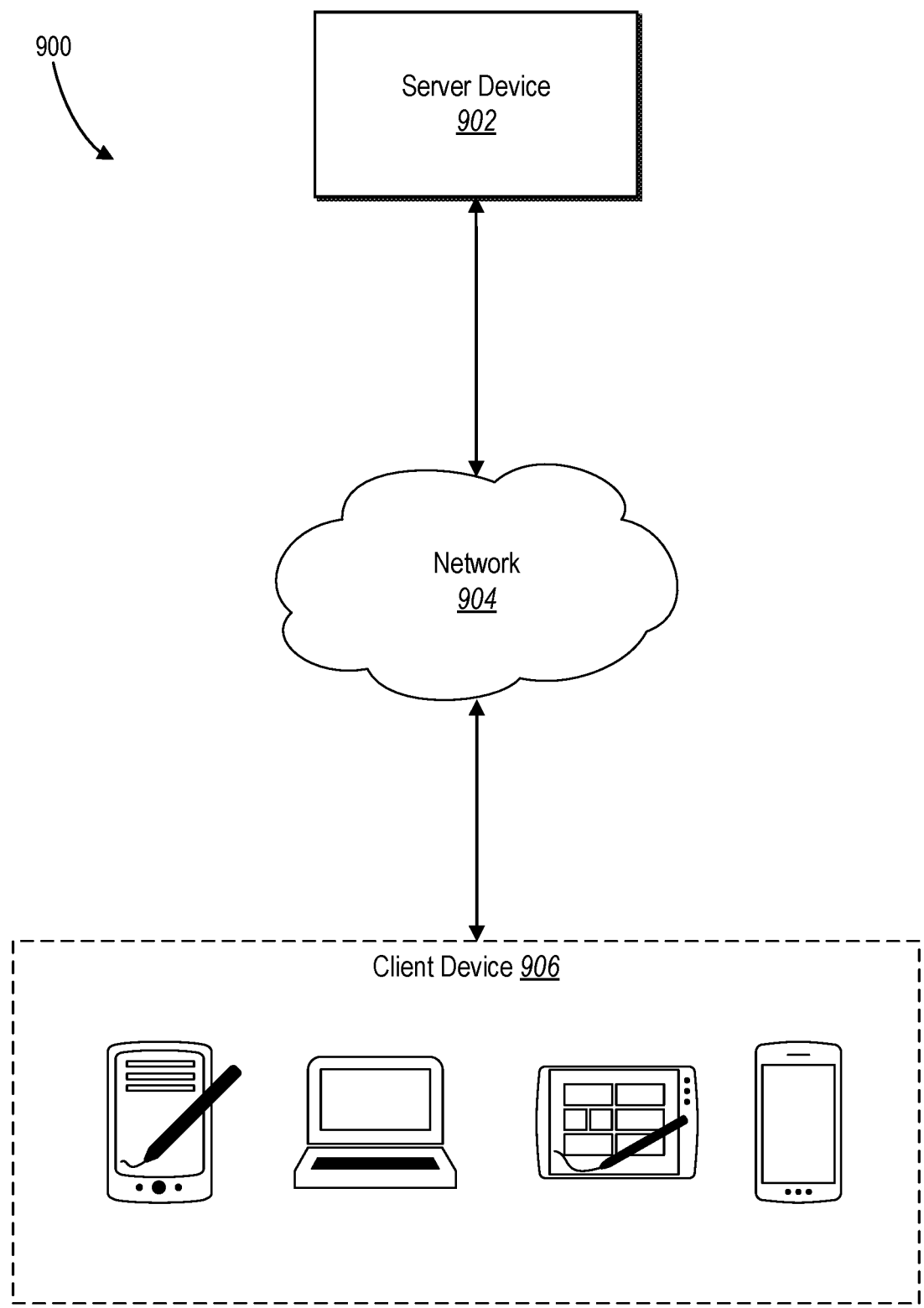
FIG. 9 illustrates a networking environment of an electronic survey system in accordance with one or more embodiments.

FIG. 9 illustrates an example network environment 900 of a survey network 100. Network environment 900 includes a client device 906, and a server device 902 connected to each other by a network 904. Although FIG. 9 illustrates a particular arrangement of client system 906, server device 902, and network 904, this disclosure contemplates any suitable arrangement of client device 906, server device 902, and network 904. As an example and not by way of limitation, two or more of client device 906, and server device 902 may be connected to each other directly, bypassing network 904. As another example, two or more of client device 906 and server device 902 may be physically or logically co-located with each other in whole, or in part. Moreover, although FIG. 9 illustrates a particular number of client devices 906, server device(s) 902, and networks 904, this disclosure contemplates any suitable number of client devices 906, server device(s) 902, and networks 904. As an example and not by way of limitation, network environment 900 may include multiple client devices 906, survey device(s) 902, and networks 904.

This disclosure contemplates any suitable network 904. As an example and not by way of limitation, one or more portions of network 904 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 904 may include one or more networks 904.

Links may connect client device 906, and server device 902 to communication network 904 or to each other. This disclosure contemplates any suitable links. In particular embodiments, one or more links include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 900. One or more first links may differ in one or more respects from one or more second links.

In particular embodiments, client device 906 may be an electronic device including hardware, software, or embedded logic components or a combination of two or more such components and capable of carrying out the appropriate functionalities implemented or supported by client device 906. As an example and not by way of limitation, a client device 906 may include any of the computing devices discussed above in relation to one or more embodiments described herein. A client device 906 may enable a network user at client device 906 to access network 904. A client device 906 may enable its user to communicate with other users at other client systems.

In particular embodiments, client device 906 may include a web browser, such as MICROSOFT INTERNET EXPLORER, GOOGLE CHROME, or MOZILLA FIRE-FOX, and may have one or more add-ons, plug-ins, or other extensions, such as TOOLBAR or YAHOO TOOLBAR. A user at client device 906 may enter a Uniform Resource Locator (URL) or other address directing the web browser to a particular server (such as server, or a server associated with a third-party system), and the web browser may generate a Hyper Text Transfer Protocol (HTTP) request and communicate the HTTP request to server. The server may accept the HTTP request and communicate to client device 906 one or more Hyper Text Markup Language (HTML) files responsive to the HTTP request. Client device 906 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, server device 902 may include a variety of servers, sub-systems, programs, modules, logs, and data stores. In particular embodiments, server device 902 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Server device 902 may also include suitable components such as network interfaces, security mechanisms, load balancers, failover servers, management-and-network-operations consoles, other suitable components, or any suitable combination thereof.

In particular embodiments, server device 902 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific.

The foregoing specification is described with reference to specific exemplary embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. A method comprising:
maintaining, at a first data center of an intermediate caching layer between a client device and a remote storage system, a regional cache comprising a subset of digital content items from a collection of digital content items accessible via the remote storage system, the intermediate caching layer comprising a plurality of data centers, wherein:
the plurality of data centers each comprise a content location database comprising content identification data corresponding to the collection of digital content items, and
the content identification data is mirrored across each of the content location databases at the plurality of data centers;
receiving, at the first data center, a first data request comprising a reference identifier associated with a digital content item from the collection of digital content items accessible via the remote storage system;
determining, based on the reference identifier, that one or more copies of the digital content item are not stored on one or more data centers of the plurality of data centers of the intermediate caching layer; and
in response to determining that the one or more copies of the digital content item are not stored on the one or more data centers of the plurality of data centers of the intermediate caching layer:
accessing the digital content item via the remote storage system; and
storing a copy of the digital content item on the regional cache maintained at the first data center of the intermediate caching layer.

2. The method of claim 1, further comprising:
receiving, at the first data center, the first data request from the client device; and
providing, via the regional cache maintained at the first data center, the digital content item to the client device.

3. The method of claim 1, wherein determining that the one or more copies of the digital content item are not stored on the one or more of the plurality of data centers of the intermediate caching layer comprises determining that the reference identifier associated with the digital content item is not found on the content location database of the first data center.

4. The method of claim 1, further comprising updating the content location database to include content identification data corresponding to the copy of the digital content item on the regional cache maintained at the first data center.

5. The method of claim 1, further comprising:
receiving, from the client device, a modified copy of the digital content item;
storing the modified copy of the digital content item on the regional cache of the first data center; and
updating the content location database to include content identification data corresponding to the modified copy of the digital content item.

6. The method of claim 5, wherein updating the content location database to include content identification data comprises:
generating a version identifier associated with the modified copy of the digital content item, the version identifier comprising a random number; and
appending the version identifier to a file identifier corresponding to the digital content item.

7. The method of claim 1, further comprising:
receiving, at the first data center, a second data request comprising the reference identifier associated with the digital content item;
determining, based on the reference identifier associated with the digital content item, that the copy of the digital content item is stored on the regional cache of the first data center; and
providing, from the data center and without accessing the digital content item via the remote storage system, the copy of the digital content item to the client device in response to receiving the second data request.

8. The method of claim 1, wherein the first data center comprises a plurality of networked nodes associated with corresponding reference identifier values, and wherein determining that the one or more copies of the digital content item are not stored on the one or more of the plurality of data centers of the intermediate caching layer comprises:
identifying a search node from the plurality of networked nodes associated with a reference identifier value corresponding to the reference identifier from the first data request; and
utilizing the search node to determine that one or more copies of the digital content item are not stored on one or more of the plurality of data centers of the intermediate caching layer.

9. The method of claim 1, further comprising:
determining that the regional cache has insufficient storage space to store the digital content item;
in response to determining that the regional cache has insufficient storage space, identifying one or more digital content items for removal from the regional cache that have been accessed less recently than other digital content items from the regional cache; and
storing the copy of the digital content item on the regional cache after removing the one or more digital content items.

10. A system comprising:
at least one processor; and
a non-transitory computer readable medium storing instructions thereon that, when executed by the at least one processor, cause the system to:
maintain, at a local data center of an intermediate caching layer between a client device and a remote storage system, a first regional cache comprising a subset of digital content items from a collection of digital content items accessible via the remote storage system, the intermediate caching layer comprising the local data center and a plurality of remote data centers, wherein:
the local data center and the plurality of remote data centers each comprise a content location database comprising content identification data corresponding to the collection of digital content items, and
the content identification data is mirrored across each of the content location databases at the local data center and the plurality of remote data centers;
receive, at the local data center, a first data request comprising a reference identifier associated with a digital content item from the collection of digital content items accessible via the remote storage system;
determine, based on the reference identifier, that the first regional cache of the local data center does not include the digital content item;
determine that a second regional cache of a remote data center of the plurality of remote data centers includes the digital content item;

in response to determining that the second regional cache includes the digital content item and that the first regional cache does not include the digital content item:
  request a copy of the digital content item from the remote data center without accessing the remote storage system; and
  storing the copy of the digital content item on the first regional cache of the local data center.

11. The system of claim 10, further comprising instructions that, when executed by the at least one processor, cause the system to:
  receive a second data request for one or more additional digital content items from the collection of digital content items;
  determine that the second regional cache of the remote data center includes the one or more additional digital content items; and
  determine, based on identifying that the second regional cache includes the digital content item associated with the first data request and the one or more additional digital content items associated with the second data request, that the second regional cache includes one or more related digital content items to the digital content item and the one or more additional digital content items.

12. The system of claim 11, further comprising instructions that, when executed by the at least one processor, cause the system to migrate the one or more related digital content items from the second regional cache to the first regional cache of the local data center in response to determining that the second regional cache includes the one or more related digital content items.

13. The system of claim 10, further comprising instructions that, when executed by the at least one processor, cause the system to:
  receive, at the local data center, the first data request from the client device; and
  provide, via the first regional cache of the local data center, the digital content item to the client device.

14. The system of claim 10, further comprising instructions that, when executed by the at least one processor, cause the system to update each of the content location database to include content identification data corresponding to the copy of the digital content item that identifies the copy of the digital content item on the first regional cache and the second regional cache.

15. The system of claim 11, wherein the local data center comprises a plurality of network nodes associated with corresponding reference identifier values, and wherein determining that the second regional cache of the remote data center of the plurality of remote data centers includes the digital content item comprises:
  identifying a search node from the plurality of networked nodes associated with a reference identifier value corresponding to the reference identifier from the first data request; and
  utilizing the search node to determine that the second regional cache includes a copy of the digital content item.

16. A non-transitory computer readable storage medium storing instructions thereon that, when executed by at least one processor, cause a computer system to:
  maintain, at a first data center of an intermediate caching layer between a client device and a remote storage system, a regional cache comprising a subset of digital content items from a collection of digital content items accessible via the remote storage system, the intermediate caching layer comprising a plurality of data centers, wherein:
    the plurality of data centers each comprise a content location database comprising content identification data corresponding to the collection of digital content items, and
    the content identification data is mirrored across each of the content location databases at the plurality of data centers;
  receive, at the first data center, a first data request comprising a reference identifier associated with a digital content item from the collection of digital content items accessible via the remote storage system;
  determine, based on the reference identifier, that one or more copies of the digital content item are not stored on one or more data centers of the plurality of data centers of the intermediate caching layer; and
  in response to determining that the one or more copies of the digital content item are not stored on the one or more data centers of the plurality of data centers of the intermediate caching layer:
    access the digital content item via the remote storage system; and
    store a copy of the digital content item on the regional cache maintained at the first data center of the intermediate caching layer.

17. The non-transitory computer readable storage medium of claim 16, further comprising instructions that, when executed by the at least one processor, cause the computer system to:
  receive, from the client device, modifications to a recent copy of the digital content item, the recent copy of the digital content item comprising a file identifier, the file identifier comprising an identifier associated with an original copy of the digital content item and one or more version identifiers associated with previous modifications made to the original copy of the digital content item;
  store, on the first data center, a modified copy of the digital content item comprising the received modifications;
  generate a version identifier comprising a random number associated with the received modifications to the recent copy of the digital content item; and
  generate a new file identifier associated with the modified copy of the digital content item, the new file identifier comprising the file identifier of the recent copy and the version identifier appended to the file identifier of the recent copy.

18. The non-transitory computer readable storage medium of claim 17, wherein generating the new file identifier comprises:
  determining that file identifier of the recent copy of the digital content item comprises a number of version identifiers equal to a threshold number of version identifiers; and
  removing a least recent version identifier from the one or more version identifiers associated with previous modifications made to the original copy of the digital content item.

19. The non-transitory computer readable storage medium of claim 18, further comprising instructions that, when executed by the at least one processor, cause the computer system to remove a copy of the digital content item from the regional cache of the first data center corresponding to the least recent version identifier.

20. The non-transitory computer readable storage medium of claim 16, further comprising instructions that, when executed by the at least one processor, cause the computer system to:
- receive, at the first data center, the first data request from the client device; and
- provide, via the regional cache maintained at the first data center, the digital content item to the client device.

* * * * *